United States Patent [19]

Inou et al.

[11] Patent Number: 5,289,500
[45] Date of Patent: Feb. 22, 1994

[54] SIGNAL CONDITIONER

[75] Inventors: Kiyoharu Inou; Yoshio Hasegawa; Kenji Fujino; Makoto Imamura; Takanori Komuro; Shunsuke Hayashi; Hitoshi Yasui, all of Tokyo, Japan

[73] Assignee: Yokogawa Electric Corporation, Tokyo, Japan

[21] Appl. No.: 779,924

[22] Filed: Oct. 21, 1991

[30] Foreign Application Priority Data

Nov. 30, 1990 [JP] Japan ................... 2-334399
Mar. 13, 1991 [JP] Japan ................... 3-48352
Mar. 14, 1991 [JP] Japan ................... 3-49850
Mar. 14, 1991 [JP] Japan ................... 3-49851

[51] Int. Cl.$^5$ ........................................ H04B 3/46
[52] U.S. Cl. .................................. 375/10; 375/36; 340/870.39; 324/76.12; 324/76.13

[58] Field of Search ................. 375/7, 10, 36; 340/870.12, 870.13, 870.17, 870.21, 870.27, 870.38, 870.39; 324/76.12, 76.13, 602

[56] References Cited

U.S. PATENT DOCUMENTS 4,422,073 12/1983 Winner .................... 340/870.21
4,800,507 1/1989 Brown .................... 375/10
4,866,435 9/1989 Frick .................... 340/870.39

Primary Examiner—Curtis Kuntz
Assistant Examiner—Don N. Vo
Attorney, Agent, or Firm—Moonray Kojima

[57] ABSTRACT

A signal conditioner comprising a receiving part, a transmitting part, and a power supply part, wherein the main functions of these components are digitalized and common circuit elements are used for different functions. Signal conditions may be of several different types, each of which is a hardware which can accommodate various transmitters and actuators.

8 Claims, 20 Drawing Sheets

Fig.19(a)    Fig.19(b)
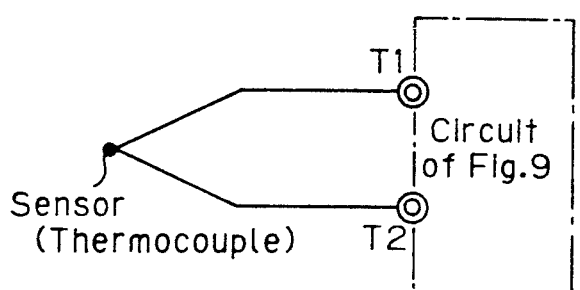
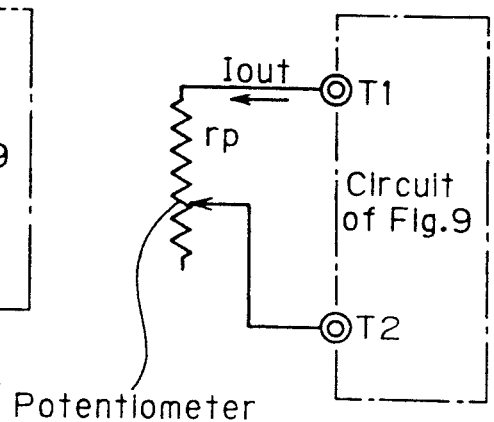
Fig.20(a) Full Power
Fig.20(b) Half Power
Fig.20(c) 3/8 Power
Fig.20(d) Stop
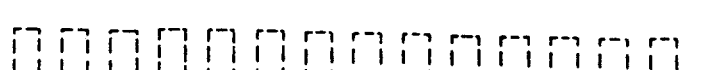

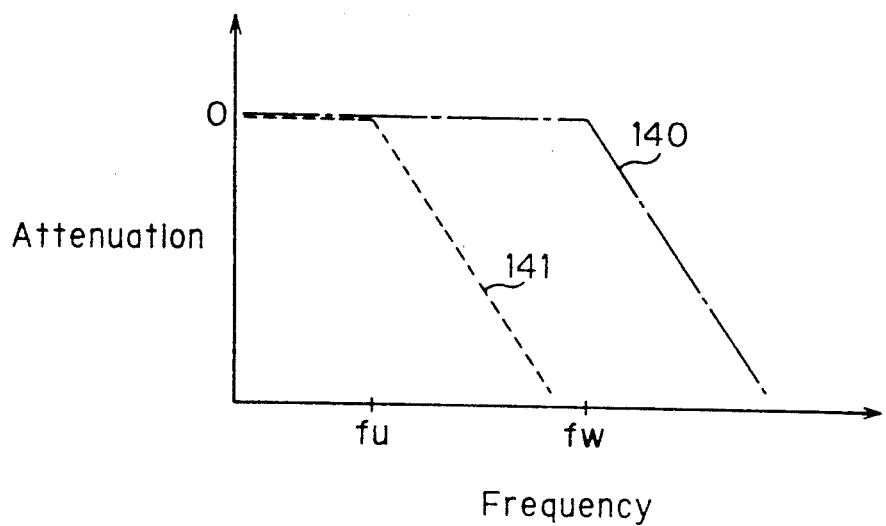

SIGNAL CONDITIONER

BACKGROUND OF THE INVENTION

1. Field of Invention

This invention relates to a signal conditioner used for a control apparatus which controls industrial processes, such as encountered in oil refineries, petrochemical facilities, steel making, paper making, etc.

2. Description of the Prior Art

In such industrial processes, raw materials are processed and fuels are used, and parameters, such as temperature, flow rate, pressure, liquid level, etc, at various locations in the plant, are measured with sensors. Actuators, such as valves, ancillary to the plant are controlled so that the parameters are held within appropriate ranges. This is important where manufactured products need to be of uniform quality. In order to provide such control, a control system consisting of mainly one or more computers has enjoyed wide acceptance.

FIG. 24 depicts locations of signal conditioners in the control system described above. The term "signal conditioner" is another term for "signal converter". FIG. 24 shows a signal conditioner 4 for receiving signals, and another signal conditioner 5 for transmitting signals. The roles of these signal conditioners are as follows. Receiving signal conditioner 4 receives the output signal SA from a transmitter 6 and arithmetically processes it to convert to a form which can be easily treated by control unit 1, consisting mainly of a computer. Transmitting signal conditioner 5 converts a control signal from control unit 1 into a signal SB, which is adapted for long distance transmission, for example, into a current signal of 4 to 20 mA shown in FIG. 6.

In the field of process control, signal SA, obtained by measurement, and signal SB for controlling an acutator 7, are normally used. The currents of these signals normally lie in the range of from 4 to 20 mA, wherein 4 mA represents 0%, and 20 mA represents 100%. For example, when signal SA of 4 mA is produced, due to measurement, it follows that the measured quantity, such as pressure, is 0. When the produced signal SA is 20 mA, then the measured quantity, such as pressure, gives a full scale reading of 100%. If signal SB for controlling the actuator is 4 mA, then the valve is fully closed. If signal SB is 20 mA, then the valve is fully opened. The reason 0% is represented by 4 mA, rather than 0 mA is to distinguish from the case when transmission line is broken and produces a current of 0 mA. Generally, a signal of 4 to 20 mA can be regarded as a low frequency signal which varies slowly with the processed amount or with the amount to which the acutator is controlled.

The conventional signal conditions are now described with reference to FIG. 24. Transmitter 6 is mounted inside a tube located in the process control system. For example, transmitter 6 measures the pressure of a liquid contained in the tube, and converts the value of the pressure into analog electrical signal SA. Receiving signal conditioner 4 arithmetically processes analog signal SA, introduced from transmitter 6, to convert the signal into a form which can be easily treated by control unit 1. The output signal from conditioner 4 is converted into digital form by an analog to digital converter (called "ADC") 2 and supplied to control unit 1.

Two examples of the arithmetic operations performed by receiving signal conditioner 4 on the analog signal, are as follows. Where transmitter 6 measures a pressure, the transmitter converts the measured pressure value into electrical signal SA, for example, of 4 to 20 mA. Only digital coded signals (hereinafter referred to as "digital signals") are intelligible to control unit 1 consisting principally of a computer. The analog signal, of 4 to 20 MA, is not intelligible to control unit 1. Generally, a voltage signal of 0 to 5 V should be applied to ADC 2. If an electric current of 4 to 20 mA is applied to ADC 2, ADC 2 cannot convert the current into digital form. Thus, receiving signal conditioner 4 arithmetically processes its input analog signal, or the current signal SA of 4 to 20 mA, into a voltage signal of 1 to 5 V.

Where transmitter 6 is a temperature transmitter using a thermocouple sensor, it produces a thermoelectromotive force of several millivolts as signal SA. Since this force is a minute voltage, converter 2 is unable to convert accurately the input signal into digital form. Also, the amplitude of the thermoelectromotive force does not have a linear relation to temperature, and signal SA does not of itself directly represent the temperature. Receiving signal conditioner 4 amplifies the thermoelectromotive force introduced from the thermocouple to an appropriate level which then can be operated on by converter 2. Then, signal SA, or the thermoelectromotive force, is converted into a signal which has a linear relation to the temperature. This process is known as linearizing.

Control unit 1 performs arithmetic operations according to the measured value supplied thereto via receiving signal conditioner 4, to appropriately control the process. The obtained digitally coded signal is applied to digital to analog (labelled "DAC") converter 3, where the signal is converted into analog form. The resulting analog signal is fed to transmitting signal conditioner 5, which then arithmetically process the analog signal to convert it into transmitted signal SB of 4 to 20 mA. This signal controls actuator 7, such as a valve, to control the flow rate to an appropriate value.

Receiving signal conditioner 4 is equipped with a power supply, not shown. In particular, transmitter 6 generally needs a supply of electric power, for example, of 24 volts, to be operated. Transmitting signal conditioner 4 is also equipped with electric power supply, not shown.

The conventional signal conditioners have the following disadvantages.

1. Many different kinds of system subcomponents must be used. Specifically, various different kinds of transmitters 6 and actuators 7 are required in order to suitably control the process. For example, needed would be transmitters for measuring temperature, transmitters for measuring flow rates, and transmitters for measuring pressure, which different transmitters are connected to different locations in a plant carrying out the process. The values obtained by the individual measurements are converted into their respective output signals taking different forms, e.g. a voltage of millivolts, a current of 4 to 20 mA, and a current of 10 to 50 mA. Thus, in order to convert the various analog signals into the same kind of signal, for example, a voltage of 1 to 5 volts, after these analog signals are arithmetically processed as mentioned above, a plurality of receiving signal conditioners 4, respectively suited for the individual signal forms of the outputs from the transmitters, are required to be prepared In addition, one transmitter needs a DC power supply of 24 volts. Another transmitter needs a power supply of 12 volts. A further transmitter requires a constant current of 4 mA, etc. As a result, the number of combinations of various power supplies and various output forms becomes exorbitant. Also, it is necessary that the number of receiving signal conditioners 4 be identical with the combinations. Also, a considerable number of different kinds of transmitting signal conditioners 5 are required to be prepared because the control signals, applied from control unit 1, are matched to the signal forms respectively required by the connected actuators 7. That is, with the prior art, the various receiving signal conditioners 4 and the various transmitting signal conditioners 5 must be prepared separately.

2. Prior art signal conditioners lack flexibility and cannot be easily modified. In the field of process control, specifications are subject to change. However, if input conditions or output conditions for a circuit that processes an analog input signal are modified, the design of the circuit must be changed or some components must be replaced to accommodate the modification. That is, prior art signal conditioners 4 or 5 are not flexible as regards circuit modifications. For this reason, whenever the input conditions or output conditions are varied, dedicated hardware devices must be prepared. Thus, these prior art arrangements cannot rapidly cope with modifications of specifications.

3. Prior art signal conditioners are not adapted to be fabricated into integrated circuits (IC). Also, since a large number of components are involved, miniaturization cannot be realized. In the past, the analog signal, which was obtained by measurement and supplied from transmitter 6 or from control unit 1, was arithmetically processed to convert the input signal into a desired signal. Although analog ICs which perform arithmetic operations on analog signals exist, input resistors, feedback resistors, capacitors, and other external components connected thereto are needed. Thus, it is impossible to substantially reduce the number of components. Accordingly, few advantages are obtained even if they are fabricated in the form of ICs. In this way, the prior art signal conditioners which perform arithmetic operations on analog signals are not adopted to be manufactured in the form of an IC.

4. Prior art signal conditioners cannot appropriately be adapted to be transmitters or actuators having communication function. In recent years, there has been increased demand for transmitters and actuators having communication functions for providing more adequate process control.

A transmitter having communication functions is now described. An ordinary transmitter measures temperature, flow rate, pressure, liquid level, or the like, and converts the measured quantity into a low frequency signal of 4 to 20 mA. A transmitter having communication function carries the information, e.g. the measuring range of the transmitter, sent from the process control system, by modulated wave. This modulated wave is sent to control unit 1 together with the low frequency by use of multiplexing transmission technique. That is, the transmitter has an intelligence function. The modulation can be effected by frequency modulation, frequency shift keying (referred to as "FSK"), or other methods.

To accommodate a transmitter producing a signal that carries multiplexed communication information, receiving signal conditioner 4 must be equipped with a demodulator. Similarly, transmitting signal conditioner 5 must have a modulator to accommodate itself to an actuator capable of receiving signals carrying multiplexed communication information. As described above in heading 1, numerous kinds of system subcomponents must be provided. In addition, where combinations of transmitters and actuators, each of which may or may not be capable of multiplexing communication information, are taken into account, the number of kinds of signal conditioners is large. Hence, the prior art arrangements are not suited for industrial use.

SUMMARY OF THE INVENTION

Accordingly, an object of the invention is to overcome the aforementioned and other deficiencies and disadvantages of the prior art.

Another object is to provide signal conditioners which are few in kind, for example, one kind, and are capable of being adapted to various transmitters and actuators.

A further object is to provide signal conditioners which, when input or output conditions are modified, can be accommodated to modification without having to change the hardware, that is by simply changing the software used therewith.

A still further object is to provide a signal conditioner whose circuit can be mostly fabricated in the form of an IC and which reduces external components.

A yet further object is to provide signal conditioners which are few in kind, such as one kind, and are capable of being adapted either to a transmitter or actuator which is capable of multiplexing communication information or which does not multiplex communication information.

Since various transmitters and actuators are connected to signal conditioners, it is necessary to select a signal conversion function which is suited for the form of output signal from the connected transformer and for the form of input signal to the connected actuator. Signal conditioners of the invention have common hardware portions which perform the main functions. The various other functions are performed and modified by use of suitable software.

The receiver portion of the invention signal conditioner converts each input signal from a transmitter into digital form. Then, various arithmetic operations are performed on the resulting digital signal to separate and extract the values and communication information contained in the input signal, the values having been obtained by measurements. The contents of the arithmetic operations can be changed by use of appropriate software under instructions from the control unit.

In accordance with the invention, it is only necessary to prepare a few kinds of signal conditioners, that is, the hardware can be held to a minimum, to accommodate a number of varied transmitters, sensors, and actuators.

BRIEF DESCRIPTION OF THE DRAWINGS

FIGS. 19(a) and 19(b) are diagrams depicting connections to the circuit of FIG. 9.

FIGS. 20(a-d) are diagrams depicting the operation of the DC/DC converter shown in FIG. 8.

FIGS. 22(a)-22(d) are timing charts depicting signals produced at various locations of the circuit of FIG. 21.

FIG. 23 is a diagram depicting the attenuation characteristics of the two low-pass filters of the circuit of FIG. 21.

DETAILED DESCRIPTION OF THE PREFERRED EMBODIMENTS

Figure 1:
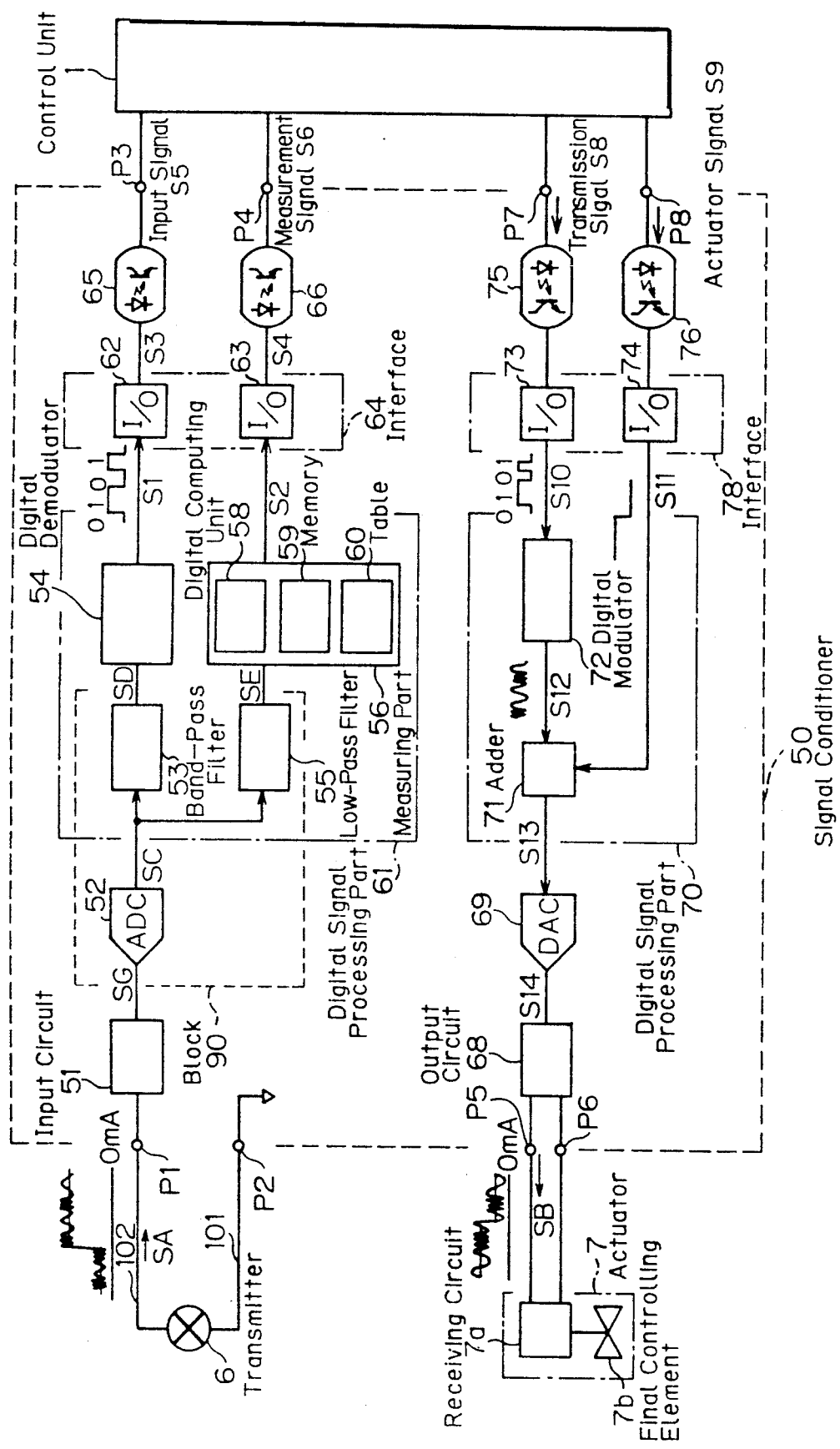
FIG. 1 is a block diagram depicting an illustrative embodiment of the invention.

Circuit details of FIG. 1 embodiment

Figure 24:
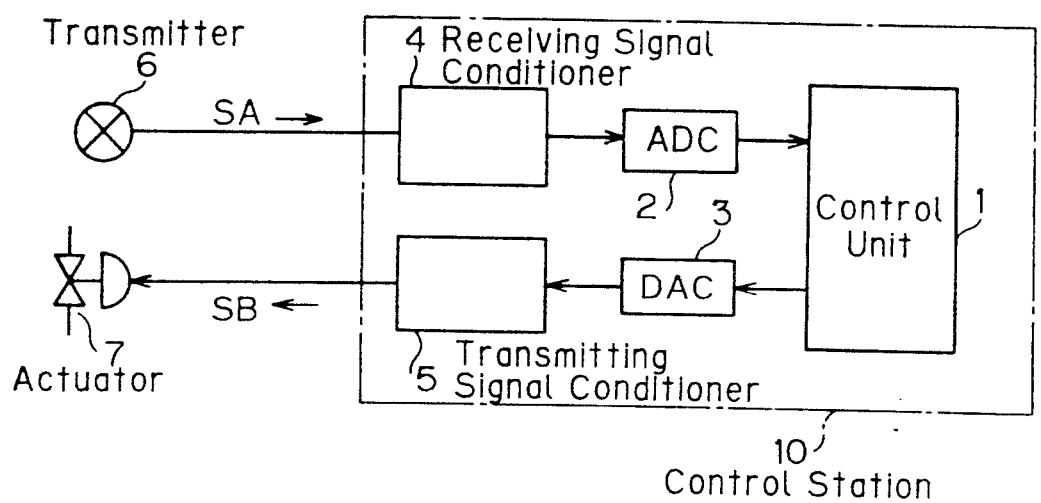
FIG. 24 is a diagram depicting the locations of signal conditioners in a control system.
Figure 25:
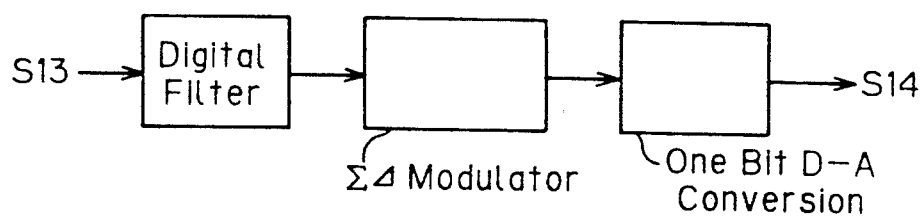
FIG. 25 is a block diagram depicting the components of the DAC 69 of FIGS. 1, 8, 14, 18.

FIG. 1 depicts an illustrative embodiment of a signal conditioner 50 of the invention, comprising a control unit 1, a transmitter 6, and an actuator 7, which are similar to the counterparts described in FIG. 24. Signal conditioner 50 combines the functions of the analog-to-digital converter (ADC) 2, the functions of the digital-to-analog converter (DAC) 3, the function of the receiving signal conditioner 4, and the function of the transmitting signal conditioner 5, all of which are shown in FIG. 24.

Signal conditioner 50 further comprises terminals P1,P2,P7, P8 and output terminals P3,P4,P5,P6. A receiver circuit part, corresponding to receiving signal conditioner 4 and analog-to-digital converter 2 of FIG. 24, is located between input terminals P1,P2 and output terminals P3,P4. A transmitter circuit part corresponding to transmitting signal conditioner 5 and digital-to-analog convert (DAC) 3 of FIG. 24, is positioned between input terminals P7,P8 and output terminals P5,P6. A line, not shown, is connected from signal conditioner 50 to transmitter 6 of FIG. 1 to supply DC power thereto. Note that no power supply is shown in FIG. 1. Actuator 7 is powered by an electrical current supplied from an output circuit 68. Where an output signal of 4 to 20 mA is produced, such electrical current is 4 mA.

The receiver circuit part receives the output signal and communication information from transmitter 6 and sends same to control unit 1. The output signal from transmitter 6 indicates the value obtained by the concerned measurement. The receiver circuit part comprises an input circuit 51 which acts to convert current into voltage and to convert impedance. The current can be converted into voltage, for example, by use of a resistor. The impedance conversion can be attained by use of an operational amplifier. In particular, in analog circuit 51, current signal SA supplied from transmitter 6 is passed through a resistor R and converted into a voltage, which in turn is amplified by a variable gain amplifier 131 shown in FIG. 21.

The gain of operational amplifier 131 is determined by instructions from control unit 1. Where transmitter 6 is a temperature measuring instrument comprising a sensor, such as a thermocouple, the resistor R of FIG. 2 acting as a current-to-voltage converter, is disconnected from the circuit under instructions from control unit 1. Then, the gain of the variable gain amplifier is switched to a higher value by operating a switch 136 of FIG. 21. In accordance with the invention, minimum function is imparted to the input circuit 51, i.e. it has only an amplification function A digital signal processing part 61, to be described hereinbelow, performs arithmetic operations.

Figure 4:
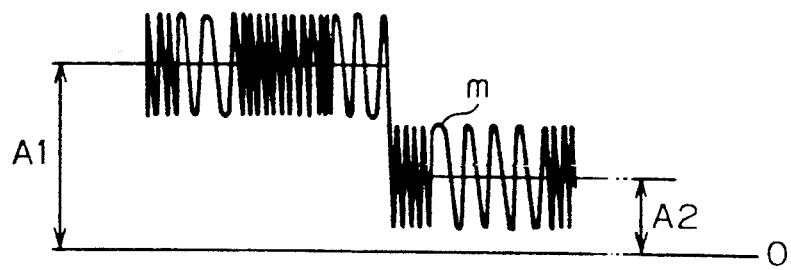
FIGS. 4(a) and 4(b) are waveform diagrams depicting multiplexed signals.
Figure 4:
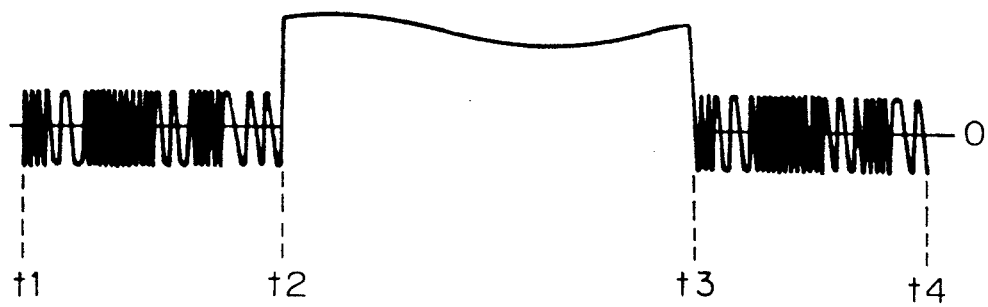
Figure 5:
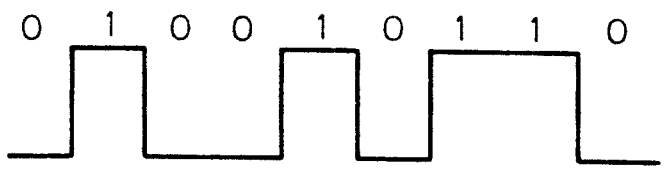
FIGS. 5(a) and 5(b) are diagrams depicting FSK modulation.
Figure 5:
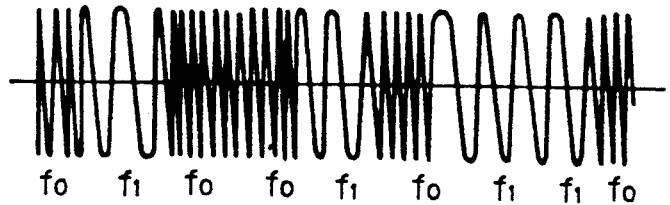
Figure 6:
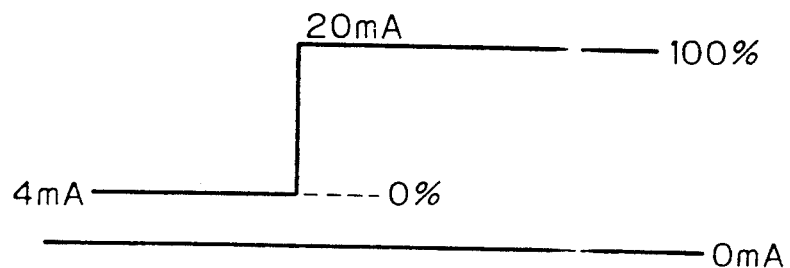
FIG. 6 is a diagram depicting a signal obtained by measurement.

In the FIG. 1 embodiment, it is assumed that a value obtained by measurement or an actuator control signal and communication information are multiplexed and that the multiplexed signal is transmitted between a control station 10 (of FIG. 24) and a process control system. The multiplexing can be either frequency division multiplexing, such as, shown in FIG. 4(a), or time division multiplexing, such as shown in FIG. 4(b). In the frequency division multiplexing shown in FIG. 4(a), an FSK modulated wave and a low speed signal of 4 to 20 mA are superimposed, the low speed indicating a value derived by measurement. In the time division multiplexing shown in FIG. 4(b), time is divided into a plurality of time slots. For example, an FSK modulated wave is transmitted during the period between t1 and t2 and during the period t3 and t4. The low speed signal is transmitted during the period between t2 and t3. The frequency shift keying (FSK) is a signaling method in which two different frequencies f0 and f1 are used to represent a binary zero and a binary one which indicate information to be transmitted, as shown in FIG. 5.

In FIG. 1, the waveforms of frequency division multiplexed signals are shown. The ADC 52 converts every mulitplexed analog signal SG supplied from input circuit 51, into a digitally coded signal SC. For example, each instantaneous value of the amplitude of the synthesized waveform m shown in FIG. 4(a) is sequentially converted into digitally coded signal SC by ADC 52. Thus, digitally coded signal SC contains information, e.g. A1 and A2, indicating values obtained by measurements, as well as information carried by the FSK modulated wave as shown in FIG. 5(a).

Digital signal processing part 61 extracts separately the low-speed signal component and the modulated signal component (or high speed signal component) from the digitally coded signal SC. These two extracted components are subjected to digital signal processing to extract the values obtained by the measurements and the transmitted information. As an example, digital signal processing part 61 comprises digital band pass filter 53, a digital demodulator 54, a digital low pass filter 55, a measuring part 56, and other components. For example, measuring part 56 comprises a digital computing unit 58, a memory 59, a table 60, and other components. Demodulator 54 extracts information transmitted thereto. Measuring part 56 extracts the values obtained by the measurements. Digital signal processing part 61 comprises a digital signal processor or the like. The characteristics and functions of components 53–60 can be modified, for example, by use of appropriate software.

An interface 64, disposed behind digital signal processing part 61, receives output signals S1 and S2 from processing part 61, and after processing, sends signals S1 and S2 to control unit 1. That is, interface 64 matches the type of data and the method of transmission of data between signal processing part 61 and control unit 1 to permit data S1 and S2 to be transmitted from processing part 61 to control unit 1. For example, interface 64 receives serial data S1 from digital demodulator 54 and converts it into parallel data S3, which is then outputted. In FIG. 1, only one signal line exists for each kind of data S3,S4, and only one photocoupler 65 or 66 is provided for each kind of data S3 and S4. In practice, however, a plurality of lines and a plurality of photocouplers are used in combination for each kind of data.

Photocouplers 65 and 66 are insulating means which prevent excessively large signals from the process control system from being directly applied to control unit 1. Photocoupler 65 produces a reception signal S5 indicating transmitted information. Photocoupler 66 delivers measurement signal S6 indicating a value obtained by measurement.

The apparatus further comprises a transmitter circuit part which receives an actuator control signal S9 from control unit 1 and a transmission signal S8 and sends same to actuator 7. Signal S9 indicates transmitted information and signal S8 indicates the amount to which the actuator is controlled.

The transmission function part is as follows. Photocouplers 75,76 are similar in operation and advantages to photocoupler 65,66. Specifically, photocouplers 75,76 transfer signals S8 and S9 from control unit 1 to an interface 78 while providing electrical insulation therebetween. Interface 78 is also similar in operation and advantage to interface 64. Interface 78 matches the type of data and method of transmission of data transferred from control unit 1 to a second digital signal processing part 70 to cause data S8, S9 to be transmitted from control unit 1 to signal processing part 70. The result is that data S10 and S11 are supplied from input-/output (I/O) circuits 73,74 to digital processing part 70. Although data S10,S11 are shown to have analog waveforms, in practice, they are digitally coded signals.

Second digital signal processing part 70 receives digitally coded signals S10,S11 from interface 78 and arithmetically processes them. Processing part 70, comprising adder circuit 71, sums up digitally coded signal S11 and another digitally coded signal S12 and produces a multiplexed, digitally coded signal S13. Digitally signal S11 indicates the amount (for example corresponding to 4 to 20 mA) to which actuator 7 is to be controlled. Digital signal S12, which is generated by digital modulator 72 after processing signal S10, represents the amplitude of the modulated signal.

Digital modulator 72 produces from signal S10 a digitally coded signal S12 which indicates each instantaneous value of the amplitudes of the signals of the frequencies f1 and f0 according to the binary state, i.e., 1 or 0, of applied signal S10, as shown in FIG. 5. More specifically, if signal S10 assumes state 1, modulator 72 produces a digital code value indicating the instantaneous value of the amplitude of the signal of frequency f1. If signal S10 takes state 0, then modulator 72 produces a digital code value indicative of the instantaneous value of the amplitude of the signal of frequency f0.

In the FIG. 1 embodiment, actuator control signal S9, or S11, is applied directly to digital adder 71 without being digitally processed. It is also possible to digitally process the signal by some means. For example, in some cases, control unit 1 produces signal S9 indicating the amount (e.g. 0 to 100%) to which actuator 7 is to be controlled. A logic block, not shown, included in digital processing part 70 converts this signal into a digitally coded signal corresponding to 4 to 20 mA.

Digital modulator 72, which uses FSK modulation, for example, receives signal S10 and produces signal S12. Although signal S12 is shown to take an analog form, in practice, it is digitally coded and indicates the instantaneous value of the amplitude of signal waveform S12. Digital adder 71 produces the sum of digital signals S12 and S11, and generates a frequency division multiplexed signal S13. Second digital signal processing part 70 can comprise a digital signal processor or the like, in the same way as first digital signal processing part 61. The characteristics and functions of components 71 and 72 can be altered, for example, by use of appropriate software.

A DAC (digital to analog converter) 69 converts every multiplexed digital signal S13 supplied from digital signal processing part 70 into an analog signal S14. That is, DAC 69 converts digitally coded signal S13 into a synthesized analog waveform m shown in FIG. 4(a). Analog signal m contains information, e.g. corresponding to levels A1 and A2 shown in FIG. 4(a), indicating the amount to which actuator 7 is controlled, as well as information, e.g. corresponding to FIG. 5(a) information, transmitted by the FSK modulated wave.

Output circuit 68 is an analog circuit which converts signal S14 into a current signal SB. Generally, output signal S14 from DAC 69 is a voltage signal.

Actuator control signal S11, applied to adder 71, corresponds to a current of 4 to 20 mA. Thus, in output signal SB from output circuit 68, the FSK modulated wave is superimposed on a low speed signal of 4 to 20 mA. The waveform of output signal SB is as shown in FIG. 1.

A receiving circuit 7a, incorporated in actuator 7, receives signal SB and extracts the amount (e.g. current of 4 to 20 mA) to which actuator 7 is to be controlled, to actuate a final controlling means (which may be for example a valve). Receiving circuit 7a also serves to demodulate and extract the transmitted information. The range of actuator 7 is selected under instructions contained in the transmitted information. The range of actuator 7 is selected under instructions contained in the transmitted information.

Operation of the FIG. 1 embodiment

The operation of the embodiment of FIG. 1 is as follows. First, the operation of the receiver circuit part including components 51, 52, 61 is as follows. The novel signal conditioner performs suitably, whether transmitter 6 connected to conditioner 50 has a communication function or not. It is assumed that the connected transmitter has a communication function.

More specifically, transmitter 6 converts a value obtained by a measurement, into a low speed signal of 4 to 20 mA. The resulting low speed signal is multiplexed with an FSK modulated signal, or communication information, and the produced signal is delivered from the output. As an example, the communication may be of half-duplex FSK transmission (e.g. 1200 baud).

Figure 9:
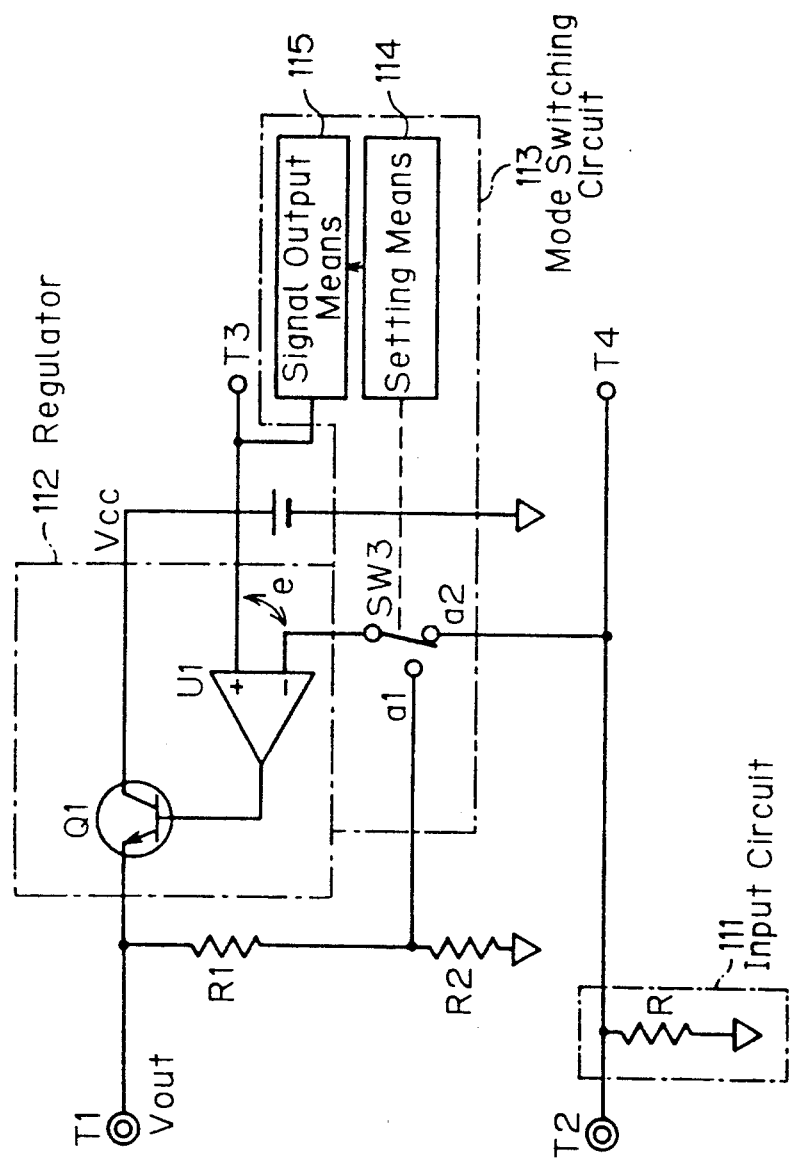
FIG. 9 is a circuit diagram depicting specific examples of the power supply part 92 of FIG. 8 and of the input circuit 51 of FIGS. 1, 2, 8.
Figure 21:
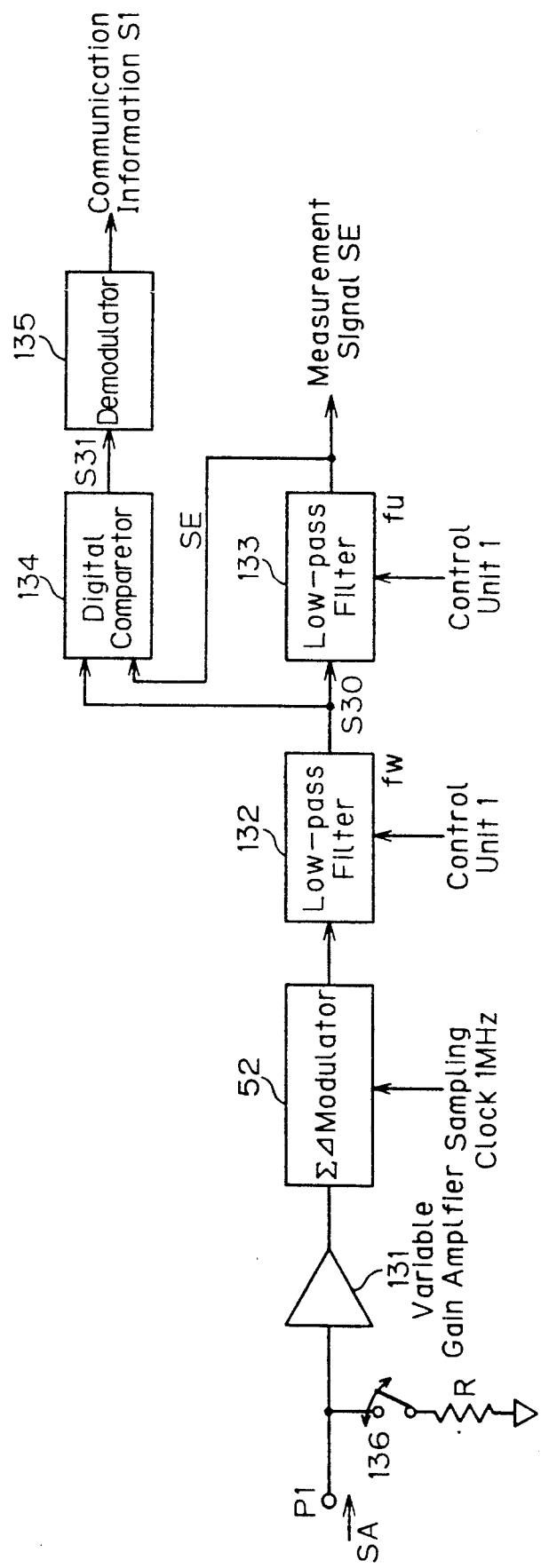
FIG. 21 is a block diagram depicting a modification of the circuitry located about ADC 52 of FIG. 1.

Input circuit 51 comprises resistor R (FIGS. 9, 21). Current signal SA, in which the signal obtained by measurement and the communication signal are maintained multiplexed, is passed through resistor R and converted into a voltage signal. The voltage signal is amplified to an appropriate voltage level by an amplifier 131 (See FIG. 21) incorporated in input circuit 51. The amplified signal is fed to ADC 52, which converts each input analog signal into digital form before application to digital signal processing part 61.

In digital signal processing unit 61, digital band pass filter 53 acts to extract desired high frequency components, or communication information components, from digitally coded signal SC. The digital low pass filter 55 serves to extract low frequency components, or values obtained by measurements. The filtering characteristics of filters 53,55 can be adjusted by use of appropriate software. For example, where the modulated wave contained in signal SA, carrying the communication information, lies in a different frequency band, the filtering characteristics can be adjusted by use of appropriate software without modifying the hardware. The band pass filter 53 functions to extract high frequency components, and comprises a high pass filter.

However, where a plurality of different kinds of communication information are transmitted, unlike the embodiment of FIG. 1, it is desirable to use band pass filters for the following reason. Where two pieces of communication information Y1 and Y2 are transmitted, information Y1 is modulated into a signal which lies within a frequency band centered at frequency fy1, for example. The other information Y2 is modulated into a signal which lies within a frequency band centered at frequency fy2. Thus, band-pass filters are needed to extract signals having bands fy1 and fy2, respectively.

Digital demodulator 54 demodulates the high frequency components supplied from ban pass filter 53, to produce a digitally coded signal having waveform S1 shown in FIGS. 1 and 5(a). An example of demodulation operation is as follows. A zero crossing detector, as shown, incorporated in demodulator 54 compares the signal delivered from band pass filter 53 with a zero point. Then, an FSK modulated signal is demodulated from the period during which the zero point is crossed. The communication information S1 demodulated in this way is sent to control unit 1 via the I/O circuit 62 of interface 64 and via photocoupler 65.

Measuring part 56 performs arithmetic operations on the digital low frequency components supplied from low pass filter 55 to obtain the measured value. These arithmetic operations are carried out by digital computing unit 58. Data necessary for the arithmetic operations and data produced during the operations are stored in memory 59. Measuring part 56 also comprises table 60. Where it is desired to convert data having a nonlinear relation into a data having a linear relation, table 60 is used. For example, the relationship between the thermoelectromotive force of the thermocouple to the temperature can be placed in the table 60. Hence, temperature can be immediately read out from the value of the thermoelectromotive force by referring to the table 60. Digital computing unit 58 performs multiplication, calculation of squares, averaging, and other arithmetic operations. These arithmetic functions can be implemented by known techniques. For example, by using function averaging, the average value of the low frequency components A1,A2 of FIG. 4(a) of signal SA sent from transmitter 6 can be taken. Digitally coded signal S2, indicating the value obtained by measuring part 56, is transmitted to control unit 1 via I/O circuit 63 and photocoupler 66.

The operation of the transmitter circuit part, comprising components 68,69,70,78, is as follows. Control unit 1 sends transmission signal S8 and actuator control signal S9 to interface 78 via photocouplers 75,76, respectively. Signals S8,S9 are digitally coded signals. Transmission signal S8 indicates transmitted information. Control signal S9 indicates the amount to which the actuator 7 is to be controlled. As a result, signal S10, shown in FIG. 1, consisting of a list of transmitted data is sent from I/O circuit 73 to digital modulator 72. Modulator 72 produces digitally coded signal S12 in response to signal S10. Signal S12 indicates the amplitude of the modulated wave. Although signal S12 is shown to have analog waveform, the signal is actually a digitally coded signal representing the instantaneous value of the amplitude of the modulated wave.

Meanwhile I/O circuit 74 supplies signal S11 to second digital signal processing part 70. Signal S11 indicates the amount to which the actuator is to be controlled. Where a digitally coded signal corresponding to a current of 4 to 20 mA is produced as actuator control signal S9 by control unit 1, digital signal processing part 70 can supply input signal S11 directly to adder 71 without first arithmetically processing the same. However, if control unit 1 produces only signal S9 indicating the amount, i.e. from 0% to 100%, to which actuator 7 is to be controlled, then an arithmetic block, not shown, included in digital signal processing part 70, first converts signal S9 into a digitally coded signal corresponding to signal of 4 to 20 mA.

Digital adder 71 produces the sum of signals S12 and S11, and generates signal S13 which is frequency division multiplexed. DAC 69 converts every multiplexed, digitally coded signal S13 supplied from digital signal processing part 70 into analog signal S14 which contains two types of information. One type of information indicates the amount to which actuator 7 is to be controlled, and comprises, for example, low frequency components corresponding to A1, A2 of FIG. 4. The other type of information is communication information carried by an FSK modulated wave, and comprises, for example, high frequency components as shown in FIG. 5(b).

Output circuit 68 converts signal S14 into current signal SB and outputs this signal. Since actuator control signal S11 applied to adder 71 corresponds to an electrical current of 4 to 20 mA, output circuit 68 produces signal SB having the waveform shown in FIG. 1. In signal SB, the FSK modulated wave is superimposed on the low frequency signal of 4 to 20 mA.

Receiving circuit 7a, included in actuator 7, receives signal SB and activates final controlling element 7b with a current of 4 to 20 mA. Receiving circuit 7a also acts to extract the communication information form the high frequency components of the transmitted signal by demodulation, and acts to change the range of actuator 7 of that range instructed by the communication information.

Figure 2:
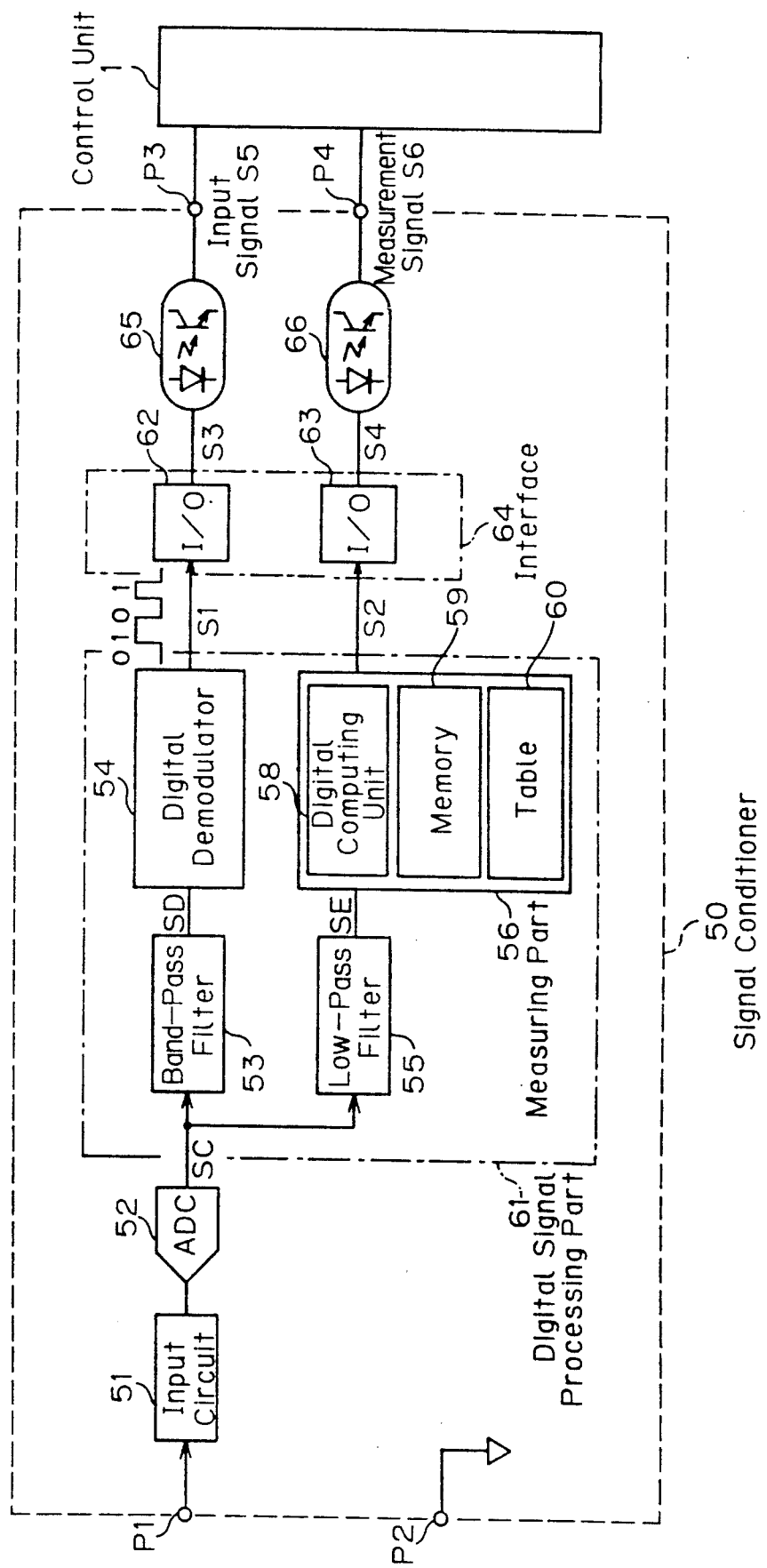
FIG. 2 is a block diagram depicting another illustrative embodiment of the invention.

Although the embodiment of FIG. 1 shows signal conditioner 50 as comprising a receiving circuit portion and a transmission circuit portion, the invention is not to be considered to be so limited. For example, the conditioner 50 could just as well comprise one of such two discussed portions. FIG. 2 shows the signal conditioner as comprising only the receiving circuit portion.

In the foregoing embodiment, the multiplexed signal is frequency division multiplexed. Of course, the novel signal conditioner of the invention can transmit and receive information about values obtained by measurements and communication information with a time division multiplexed signal (See FIG. 4(b)). In particular, during the period between t1 and t2 and during the period between t3 and 4t4 of FIG. 4(b), signal S1 is obtained from digital demodulator 54. During the period between t2 and t3 of FIG. 4(b), signal S2 is obtained from the measuring part 56. The signal applied between terminals P1 and P2 comprises low frequency signal of 4 to 20 mA multiplexed with the modulated wave. However, where transmitter 6 relies on a sensor, such as a thermocouple, a feeble thermoelectromotive force is produced as signal SA. Where such sensor is connected to signal conditioner 50, control unit 1 applies an instruction signal to signal conditioner 50 to disconnect resistor R from input circuit 51, the resistor R being used for current to voltage conversion. Consequently, the gain of the variable gain amplifier included in input circuit 51 is switched to the higher gain (see FIG. 21).

Description of Analog to Digital Converter

Analog to digital converter (called "ADC") 52 may be one of two which are broadly classified as flash converters and as successive approximation converter. A flash ADC uses $2^n$ comparators, and converts input voltage directly into a coded digital value closest to the input voltage. This type of DC makes use of tracking analog to digital conversion. Specifically, digital codes are so tracked that the output voltage from a reference digital to analog converter is closest to the input signal. This invention, advantageously, involves a reduced number of kinds of components and is easily fabricated in the form of an integrated circuit, also called "IC", especially when either kind of analog to digital converter is used as ADC 52. However, if an oversampled analog to digital converter is used in signal conditioner 50 which transfers signals containing multiplexed communication information, then many other advantages are attained, as will be described hereinafter. Thus, an oversampled ADC will be next described.

In recent years, in the field of process control, resolution on the order of 14 bits has been required in measuring low frequency components, such as A1 of FIGS. 4(A) and 4(b), of less than 100 Hz sent from transmitter 6. On the other hand, the frequency of a communication signal (see FIGS. 4(a) and 4(b)) multiplexed with the measured components is generally of the order of 10 KHz. It is considered that resolution of 6 bits suffices to measure the communication signal, because the contents of the communication signal can be read as long as f0 and f1 can be distinguished from each other as shown in FIGS. 5(a) and 5(b).

Figure 7:
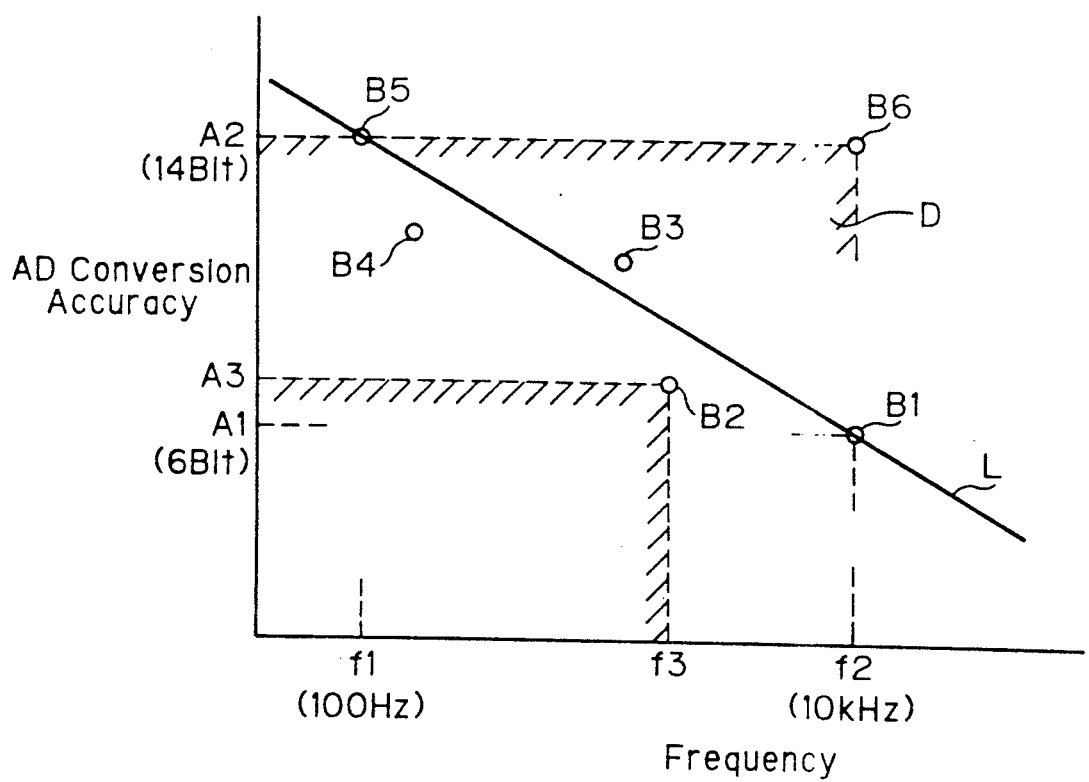
FIG. 7 is a diagram depicting the relation between frequency and conversion efficiencies of an analog-to-digital converter and of a digital-to-analog converter.

Accordingly, an analog to digital converter which exhibits a resolution of 14 bits at 100 Hz and 6 bits at 10 KHz is desired for use as aDC 52 in the embodiment of FIG. 1. FIG. 7 shows the relationship between the number of converted bits, or resolution, to the frequency of the input signal applied to a DC. Normally, in an analog to digital converter, the number of converted bits has a reciprocal relationship to frequency. That is, the relationship is given by line L in FIG. 7. If an ADC, having a given design, has a characteristic indicated by point B2 in FIG. 7, then it follows that this converter can convert an analog signal of a frequency between 0 and f3 with A3 bits. Another DC has a characteristic indicated by point B3.

Thus, if no measure is taken, an ADC which needs 14 bits at 10 KHz and has a characteristic indicated by point B6, i.e., satisfies both point B1 (a resolution of 6 bits at 10 KHz) and point B5 (a resolution of 14 bits at 100 Hz), is required. However, this ADC which needs 14 bits at 10 KHz has a property much superior to the characteristic line L (see FIG. 7) generally obtained. If this ADC is fabricated from a flash type converter or from a successive approximation type converter, then the apparatus becomes costly and would be large in size.

The invention solves the above mentioned problems, i.e., expensiveness and bulkiness, by using an oversampled ADC for aDC 52. In summary, an oversampled ADC provides large oversampling ratios for low frequency signal components. Hence, analog to digital conversion is effected with high accuracy. For high frequency signal components, the oversampling ratio is reduced and so the accuracy of the analog to digital conversion is deteriorated. That is, in accordance with the invention, resolution of 14 bits at 100 Hz and resolution of 6 bits at 10 KHz can be realized simultaneously with a single oversampled analog to digital converter, as will be described in detail hereinafter.

Figure 3:
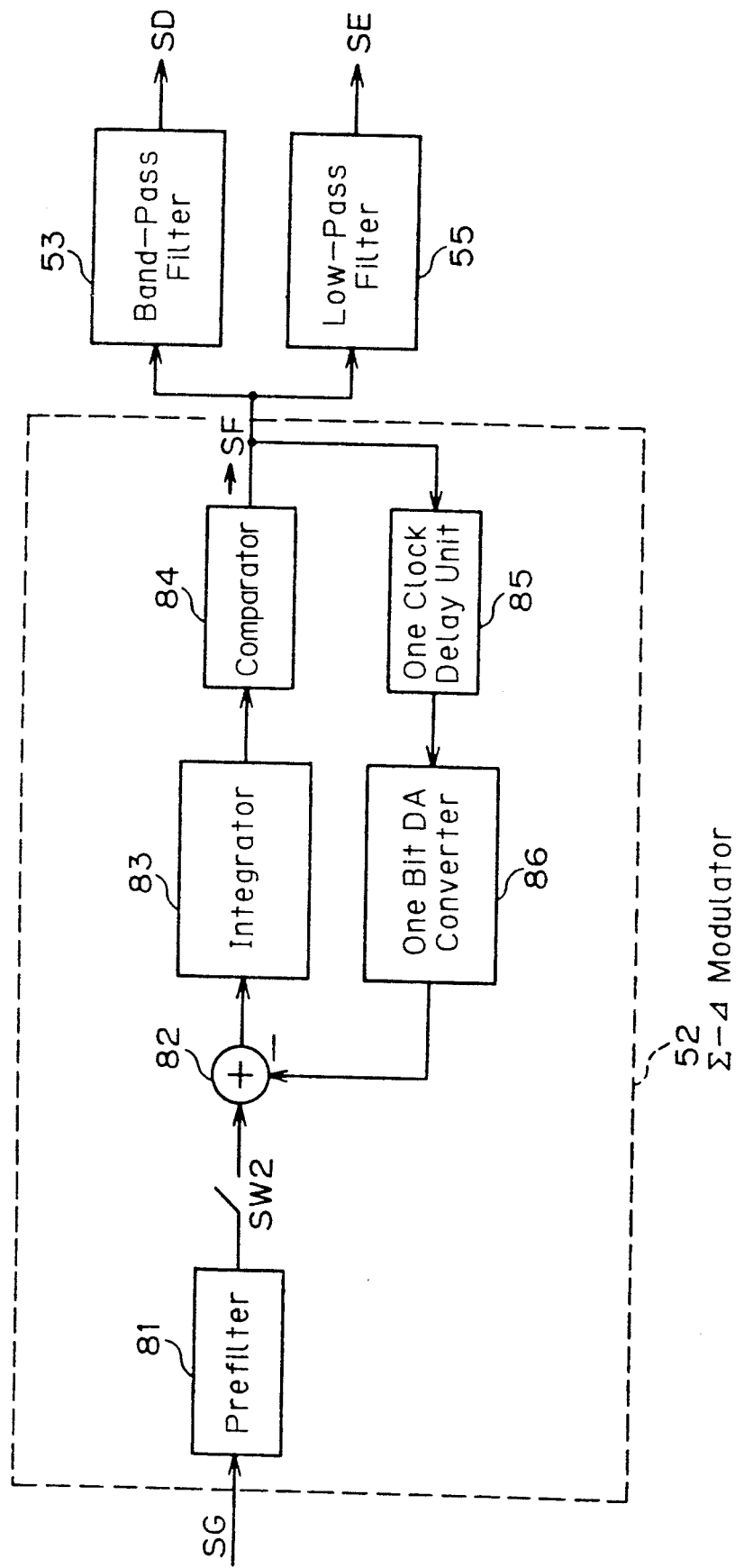
FIG. 3 is a block diagram depicting an analog-to-digital converter used in the embodiments of FIGS. 1 and 2.

FIG. 3 depicts the configuration of an oversampled analog to digital converter, which corresponds to block 90 (shown with broken lines in FIG. 1). Generally, as shown in FIG. 3, an oversampled analog to digital converter is a combination of a Σ-Δ modulator 52 and digital filters 53,55, the filters being connected to the output of modulator 52. It is assumed, however, that modulator 52 corresponds to ADC 52 of FIG. 1 so that the circuit of FIG. 3 may correspond to the block 90 of FIG. 1.

Operation of the ADC

The operation of the FIG. 3 circuit is as follows. The output SG from input circuit 51 of FIG. 1 is applied to a prefilter 81. Filter 81 filters out those frequency components which are higher than the Nyquist frequency, or half of the sampling rate, to prevent foldover noise due to sampling. The output from filter 81 is sampled by a switch SW2. One of the features of the oversampled analog to digital converter is that the sampling rate is set to be sufficiently higher than the frequency of the signal obtained from the subject that is to be eventually measured (e.g. at least 10 times as high as ). An analog adder 82 produces the difference between the sampled input signal value and virtual, forecasted waveform produced from a 1-bit DAC (digital to analog converter) 86. An integrator 83 integrates the output from adder 82. The output from integrator 83 is quantized by a comparator 84. The output from comparator 84 is fed to 1-bit DAC 86 via a 1-clock delay unit 85 comprising a D flip-flop. Block 52 (indicated by the broken lines)is generally known as a $\Sigma$-$\Delta$ modulator, which subjects its input SG to sigma delta modulation, and produces a modulated signal SF. Signal SF (which is subjected to the sigma delta modulation) differs somewhat in a sense from digital signals obtained from a flash type or successive approximation type converter, but yet the sigma delta modulated signal SF is derived by converting input signal SG into digital codes. For this reason, it is assumed herein that the $\Sigma$-$\Delta$ modulator 52 corresponds to ADC 52 of FIG. 1.

What is meant by the description somewhat difference in a sense, is that if ADC 52 of FIG. 1 is comprised of a flash ADC or successive approximation ADC, its output signal SC is a digitally coded signal which corresponds to the input signal SG in a 1:1 relation. The output signal is passed through band pass filter 53 and low pass filter 55, to extract high frequency components SD and low frequency components SE. On the other hand, if an oversampled ADC is used, output SF from $\Sigma$-$\Delta$ modulator 52 is obtained by subjecting input signal SG to sigma delta modulation. Thus, the output signal does not have a 1:1 relation to input signal SG. In the oversupplied ADC, a digitally coded signal corresponding to input signal SG is not obtained until sigma delta modulated signal SF is passed through the digital filters. More specifically, band pass filter 53 produces the digitally coded signal SD which corresponds to the high frequency components of the input signal SG in a 1:1 relation, while low pass filter 55 generates digitally coded signal SE that corresponds to the low frequency components in a 1:1 relation. Band pass filter 53 and low pass filter are the same as their counterparts of FIG. 1.

Briefly, signal SD, which is obtained by converting the high frequency components shown in FIG. 5 into 6 bit digital codes, for example, is extracted by passing the sigma delta modulated signal SF through band pass filter 53. Also, signal SE, which is obtained by converting the low frequency components, arising from measurement, into 14 bit digital codes, for example, is extracted by passing the modulated signal through low pass filter 55.

In particular, when low pass filter 55 is used, low frequency components of 4 to 20 mA are sampled at a large oversampling ratio and arithmetically processed. Thus, the quantization error is small. The digitized data is accurate That is the accuracy of the analog to digital conversion, for example, resolution of 14 bits, is determined by the oversampling ratio. Thus, the oversampling ratio is increased as the frequency of the signal becomes lower. As a result, the analog signal is converted into digital form at higher resolution.

On the other hand, the output from $\Sigma$-$\Delta$ modulator 52 can also be converted into a digitally coded signal by the use of band pass filter 53. However, the quantization error would be large, because the high frequency signal components are sampled at a small oversampling ratio and then arithmetically processed. The data is then converted into digital form Consequently, the accuracy of the digital data is low. Thus, the high frequency components are converted at an accuracy of, for example, 6 bits. In this manner, in the oversampled analog to digital converter, the conversion accuracy is 6 bits at 10 KHz, such as at the point B1 for the high frequency components and 14 bits at 100 Hz, such as at the point B5 for the low frequency components such as shown in FIG. 7.

In this embodiment, an oversampled ADC is used as the ADC 52 of the receiving circuit portion. Similar advantages, such as that the requisite functions can be attained economically, are attained by using an oversampled DAC, as the DAC 69 of the transmission circuit part of FIG. 1. FIG. 22 shows a common oversampled digital to analog converter. The $\Sigma0\Delta$ modulator is similar in configuration to the $\Sigma$-$\Delta$ modulator shown in FIG. 3.

In the embodiments of FIGS. 1, 2, 3, two filters are provided. More filters may also be provided to select a plurality of different kinds of information about frequencies. In this case, a high pass filter cannot be used as filter 53 as previously mentioned. A band pass filter must be used. In the embodiment, communication information is transferred by FSK modulation. It is to be noted, however, that the modulation is not limited to FSK modulation.

In the embodiments of FIGS. 1 and 2, it is assumed that transmitter 6 is connected to signal conditioner 50 via a three line transmission path. In particular, a power supply, not shown, is connected from signal conditioner 50 to transmitter 6, in addition to the illustrated lines 101 and 102. The power supply part of the signal conditioner 50 shown in FIG. 1 has been omitted.

Transmitter connected via two line transmission path

Figure 8:
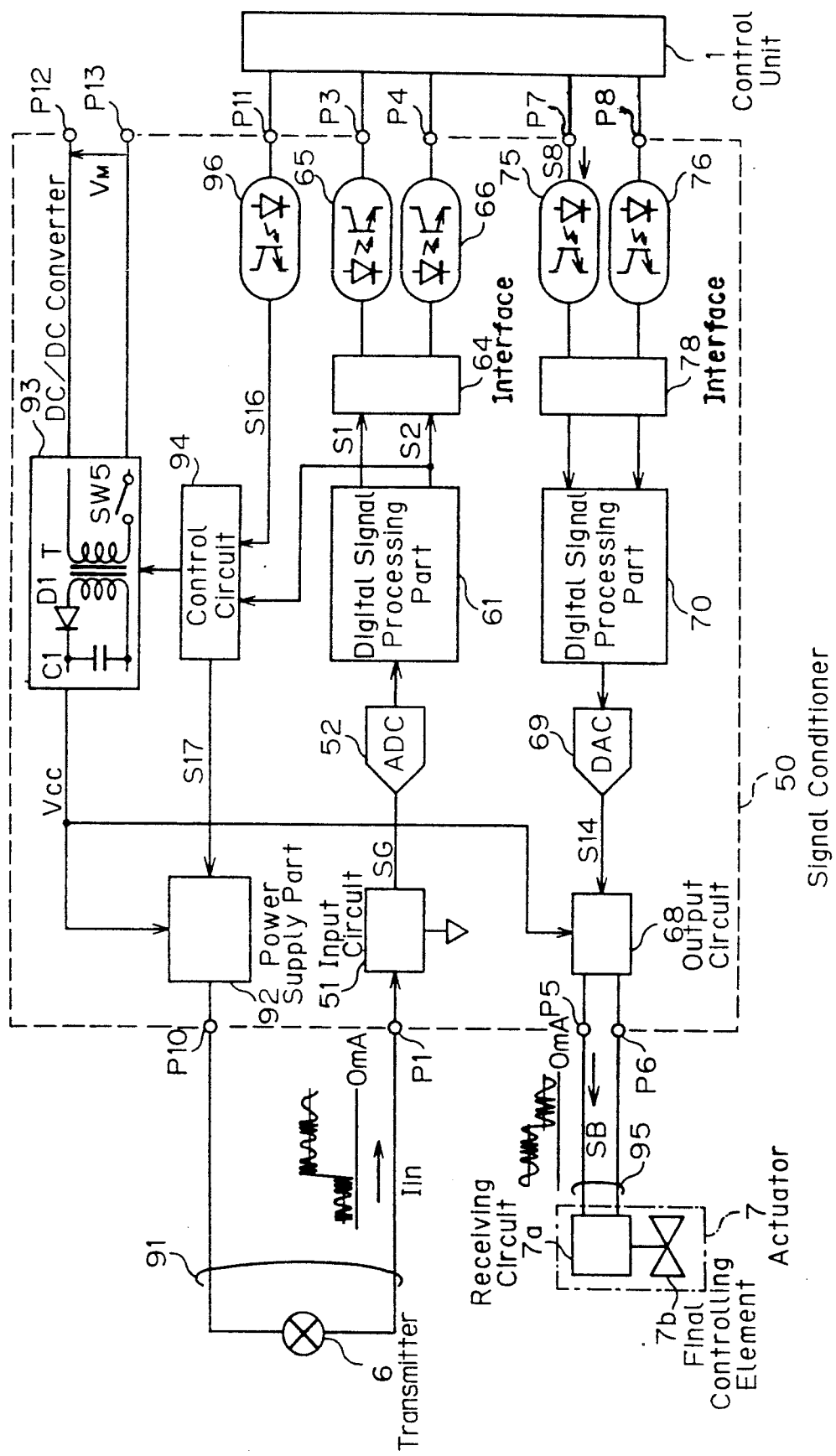
FIG. 8 is a block diagram depicting a further illustrative embodiment of the invention.

FIG. 8 shows a configuration in which the transmitter 6 is connected via a two line transmission path 91. The embodiment of FIG. 8 is similar to the embodiment of FIG. 1 except that signal conditioner 50 and transmitter 6 are interconnected via two line transmission part 91 and that there are also added a power supply part 92, a DC/DC converter 93, a control circuit 94, and a photocoupler 96. In FIG. 1, digital signal processing part 61,70 and interfaces 64,78 are each represented as comprising separate functional blocks, whereas in FIG. 8 these parts are each represented as comprising a single block.

In the embodiment of FIG. 8, DC/DC converter 93 converts a DC voltage VM applied between terminals P12 and P13 into a different value of DC voltage Vcc, and delivers this voltage. Converter 93 can be of a conventional structure. For example, converter 93 comprises a switch SW5, a transformer T, a rectifying diode D1, a smoothing capacitor C1, and other components.

Control circuit 94 controls the amplitude of output voltage Vcc from DC/DC converter 93 in response to a signal S16 applied from control unit 1. Control circuit 94 receives signal S2 from digital signal processing part 61, signal S2 being obtained by measurement. As an example, if a short circuit occurs in transmitter 6, signal S2 assumes an abnormal value. This is detected, and output voltage Vcc is reduced quickly to prevent unwanted power loss.

The value of the output voltage Vcc is controlled as follows. Control circuit 94 controls the ratio of the time, for which switch SW5 of DC/DC converter 93 is turned ON , to the time, for which SW5 is turned OFF, as shown in FIGS. 20(a)-20(d). Consequently, electric power supplied to transformer T of converter 93 is controlled. Voltage developed on the secondary side of transformer T changes according to this ratio.

FIGS. 20(a)-20(d) show the ON and OFF states of switch SW5. When the solid line goes high, switch SW5 is turned ON. In the case of full power, see FIG. 20(a), maximum output voltage Vcc is obtained. As the ratio of the time for which switch SW5 is turned ON increases, output voltage Vdc decreases. If the number of ON states is controlled to a ratio of ⅜, as shown in FIG. 20(c), then the output power is limited to ⅜ of full power.

The power supply part 92 of FIG. 8 receives constant DC voltage Vcc from DC/DC converter 93 and produces a voltage, for example 24 V, at its output terminal P10. The produced voltage is instructed by a control signal S17 applied from control circuit 94. That is control signal S17 indicates the output voltage, in volts, or output current, in milliamperes, from power supply part 92.

It is assumed that transmitter 6 is able to carry the value obtained by measurement, e.g. 4 to 20 mA, on the high frequency communication information as described in connection with FIG. 4, and to deliver the information containing the value.

Input circuit 51 has a resistor R, for example, between input terminal P1 and a common potential. The low frequency signal of 4 to 20 mA supplied from transmitter 6 and the high frequency signal, which is superimposed on the low frequency signal, are converted into a voltage signal by resistor R. This voltage signal is amplified by an amplifier of input circuit 51 so as to produce signal SG of an appropriate amplitude. The output from the amplifier of input circuit 51 is fed to ADC 52.

In the embodiment of FIG. 8, a voltage or current is supplied from power supply part 92 to transmitter 6 via one line of the two line transmission path 91, while signals from transmitter 6, i.e, the value obtained by measurement and communication information are supplied to input circuit 51 via the other line.

Description of power supply, input or output circuit components

FIG. 9 shows a specific example of power supply part 92 and input circuit 51 or output circuit 68 shown in FIG. 8. In FIG. 9 almost all of the components are used in common and switch SW3 is switched between two different states. In one state, the embodiment functions to supply electric power to transmitter 6. Also, it acts as input circuit 51 receiving the transmission signal from transmitter 6. In the other state, the circuit acts as output circuit 68, sending output signal SB to actuator 7.

A transmission path is connected to a pair of external terminals T1 and T2. An input circuit 111 receives current flowing through the transmission path, or current flowing between the terminals T1 and T2. In this example, a resistor R is connected between terminal T2 and common. The resulting voltage drop is exploited to extract the received signal. Input circuit 111, which corresponds to input circuit 51 of FIG. 1, may use an element other than resistor R.

A regulator 112 is designed to operate either in a constant current mode, in which case regulator 112 produces a constant current which is applied to external terminals T1,T2; or in a constant voltage mode, in which case, regulator 112 produces a constant voltage which is applied to terminals T1,T2. Regulator 112 comprises a transistor Q1 and an amplifier U1 whose output terminal is connected to the base of transistor Q1. The collector of the transistor Q1 is connected to DC voltage Vcc, while the emitter thereof is connected to external terminal T1.

A mode switching circuit 113 comprises a setting means 114, a signal output means 115, and a switch SW 3. Switching circuit 113 switches regulator 112 between the constant voltage mode and the constant current mode, depending on the kind of field apparatus connected to external terminals T1,T2.

Setting means 114 connects switch SW3 either to contact a1 or to contact a2, under instructions from control unit 1, shown in FIG. 8. Thus, regulator 112 is operated either in the constant current mode or in the constant voltage mode.

Signal output means 115 may or may not apply a signal of a given amplitude to one input terminal (+) of amplifier U1, depending on the mode set by setting means 114. As an example, signal output means 115 comprises a digital to analog converter.

Voltage dividing resistors R1 and R2 are connected between output terminal T1 and the common. The signal received by resistor R of input circuit 111 appears at signal take out terminal T4. A signal application terminal T3 is connected to one input terminal (+) of amplifier U1 of regulator 112. A signal, which is to be transmitted either to transmitter 6 or to actuator 7 shown in FIG. 8, is applied to signal application terminal T3 from control circuit 94.

Where the circuit of FIG. 9 is operated as output circuit 68 shown in FIG. 8, the signal to be transmitted is signal S14 that is generated either from actuator control signal S9 delivered from control unit 1 or from communication information S8. In this case, signal output means 115 shown in FIG. 9 acts also as DAC 69 shown in FIG. 8.

Where the circuit shown in FIG. 9 is used to supply electric power and also used as input circuit 51, the signal to be transmitted comprises a voltage, say 24 V, or a current, say 4 mA, to be supplied to connected transmitter 6 to provide power thereto, together with communication information S8 (FIG. 8, 14) transferred from control unit 1 to transmitter 6.

The common terminal of switch SW 3 is connected to the other (−) input terminal of amplifier U1. Contact a1 is connected to the junction of voltage dividing resistor R1,R2. Contact a2 is connected to one end of resistor R of input circuit 11. Switch SW3 is actuated by setting means 114.

When switch SW3 is connected to contact a1, voltage dividing resistor R1 acts as a feedback resistor for amplifier U1. Input terminal (−) of amplifier U1 is coupled to the common via resistor R2. The result is that regulator 112 operates in a constant voltage output mode in which the amplification degree is given by (1+R1/R2).

On the other hand, when switch SW3 is connected to contact a2, regulator 112 operates in a constant current output mode for the following reason. The two input terminals (+) and (−) of amplifier U1 are substantially at equipotential as long as amplifier U1 operates normally. Let e be the voltage developed between the two input terminals (+) and (−) of amplifier U1. Let Vout be the output voltage from regulator 112. Then, the following relation holds:

$$Vout = A \cdot e$$

wherein A is the gain in the open loop in regulator 112 and is normally 80 dB. Since output voltage Vout is 24 V, for example, e is calculated at about 0 V from the above equation.

Therefore, if a constant voltage Eo is applied to terminal T3 from control circuit 94 of FIG. 8, then this constant voltage is kept applied to resistor R via contact a2 of switch SW3. Thus, it follows that a current given by Iin=Eo/R keeps flowing through resistor R. Because current Iin is supplied from terminal T2, constant current Iin is fed to the transmitter connected between terminals T1 and T2.

The circuit of FIG. 9 operates either in a first mode or in a second mode, to be described hereinbelow in greater detail. In the first mode, electric power is supplied to transmitter 6, and the circuit of FIG. 9 operates as input circuit 51 receiving the signal transferred from transmitter 6. In the second mode, the FIG. 9 circuit operates as output circuit 68 delivering an output signal to actuator 7. These two modes are described separately hereinbelow.

FIRST MODE. In this mode, a constant voltage is supplied to transmitter 6, and the FIG. 9 circuit operates as a circuit receiving current signals from transmitter 6.

Figure 10:
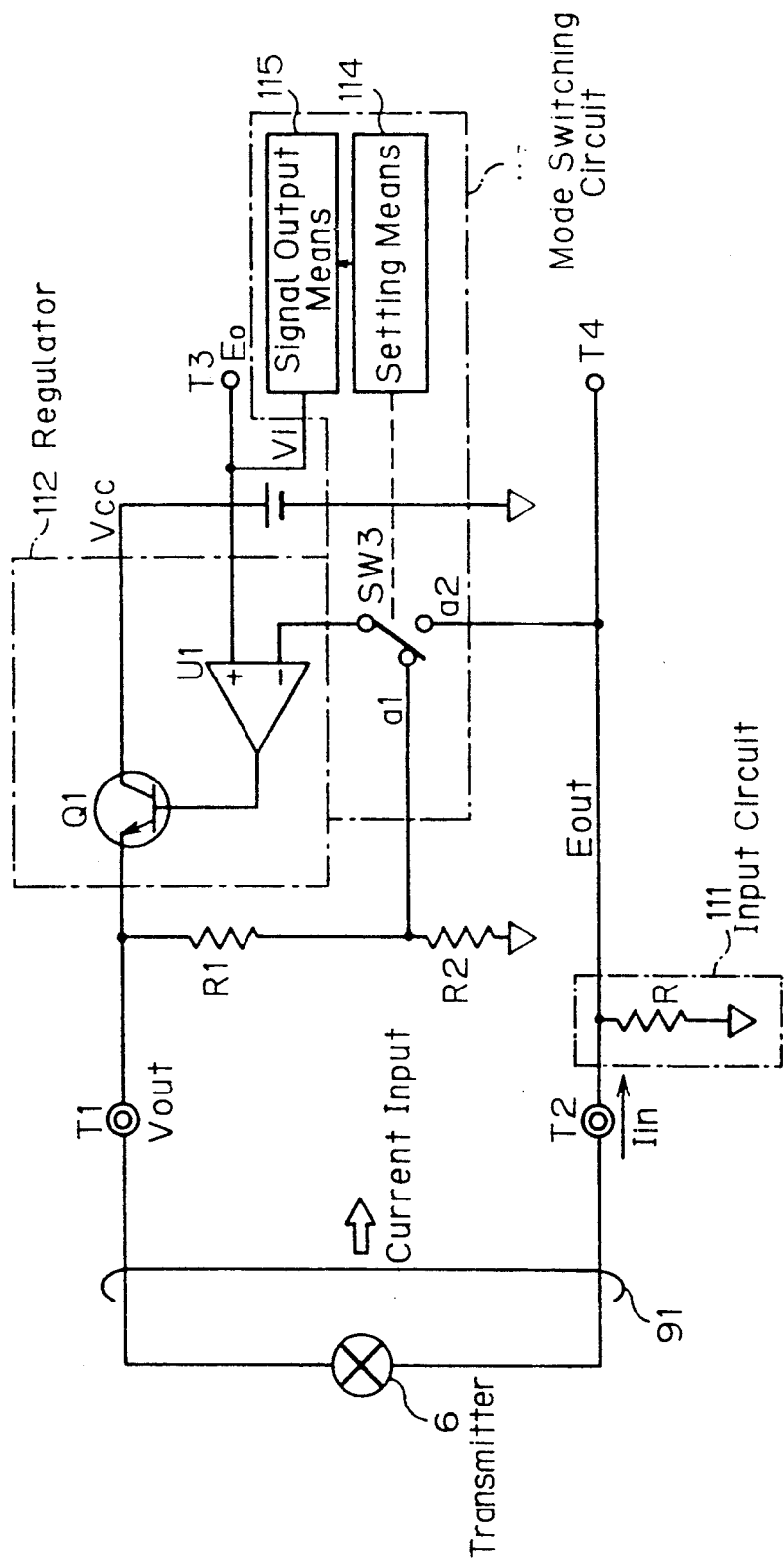
FIG. 10 is a diagram, similar to FIG. 9, depicting switch SW3 in a different switched state, and depicting other modifications.

FIG. 10 shows the connection for establishing the first mode. The relation between the components of FIG. 10 and those of FIG. 8, is as follows. External terminal T1 of FIG. 10 corresponds to terminal P10 of FIG. 8. External terminal T2 of FIG. 10 corresponds to terminal P1 of FIG. 8. The part formed by regulator 112, the resistors R1,R2, switch SW3, and mode switching circuit 113 shown in FIG. 10 corresponds to power supply part 92 of FIG. 8. Input circuit 111 of FIG. 10 corresponds to input circuit 51 of FIG. 8. Power voltage Vcc of FIG. 10 corresponds to output voltage vcc from DC/DC converter 93 of FIG. 8.

Transmitter 6 is connected between external terminals T1,T2 of FIG. 10, via transmission path 91, to deliver current signal Iin. Setting means 114 connects switch SW3 to contact a1. Thus, voltage divided by dividing resistors R1,R2 is fed back to one input terminal (−) of amplifier U1 of regulator 112. Regulator 112 operates in the constant voltage output mode. Signal output means 115 delivers a given voltage signal Vi to the other input terminal (+) of amplifier U1. In this manner, output voltage Vout produced between external terminal T1 and common is maintained by regulator 112 at a constant voltage, for example 24 V, corresponding to given voltage signal vi. That is, output voltage Vout appearing at terminal T1 is given by $$Vout = Vi \cdot \{1 + (R2/R1)\}$$

Transmitter 6 controls current flowing through transmission path 91 according to the process control amount, so that a process control signal is applied to terminal T2. Specifically, the process control signal, or current Iin, transmitted via transmission path 91 flows through resistor R of input circuit 111, thus producing a voltage Eout corresponding to the process control amount. Signal Eout is extracted from takeout terminal T4 and amplified so as to produce the voltage signal SG of an appropriate amplitude by an amplifier, not shown, of the input circuit 51. The output signal from the amplifier of the input circuit 51 is supplied to ADC 52 of FIG. 8.

SECOND MODE. In this mode, the FIG. 9 circuit acts as a circuit which delivers a current signal to actuator 7. In other words, the circuit operates as output circuit 68.

Figure 11:
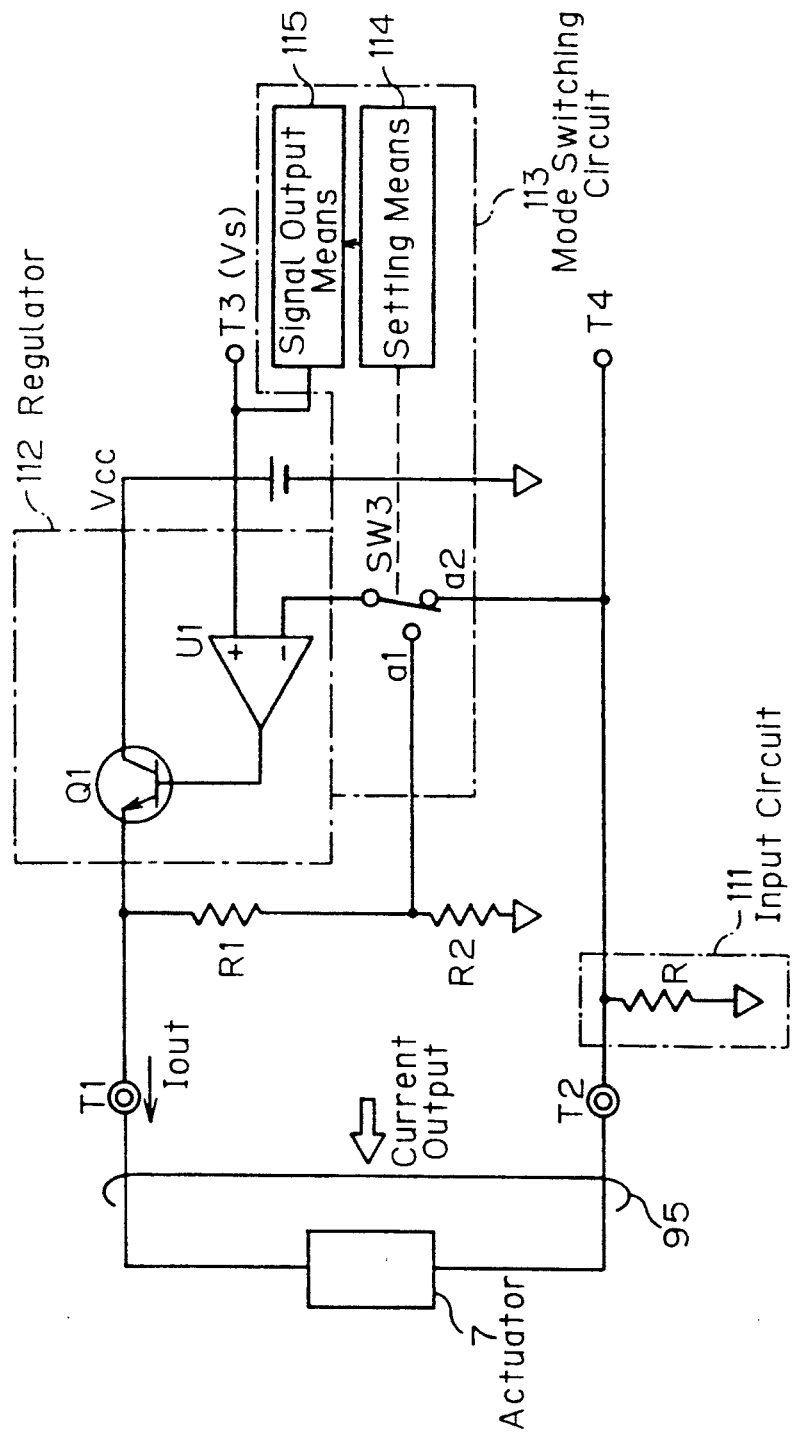
FIG. 11 is a diagram, similar to FIG. 9, depicting various modifications thereof.

FIG. 11 shows the connection for establishing the second mode. The relation between the components of FIG. 11 and those of FIG. 8 is as follows. External terminal T1 of FIG. 11 corresponds to terminal P5 of FIG. 8. External terminal T2 of FIG. 11 corresponds to terminal P6 of FIG. 8. The part formed by regulator 112, resistors R1, R2, R, switch SW3, and the mode switching circuit 113, shown in FIG. 11, corresponds to output circuit 68 of FIG. 8. Signal output mean 115 of FIG. 11 corresponds to DAC 69 of FIG. 8. Power voltage Vcc, shown in FIG. 11, corresponds to output voltage Vcc from DC/DC converter 93, shown in FIG. 8.

Actuator 7 is connected between external terminals T1,T2 via transmission path 95. Setting means 114 connects switch SW3 to contact a2. Thus, resistor R is connected as a feedback resistor to one input terminal (−) of amplifier U1 of regulator 112. Regulator 112 operates in the constant current output mode. In this state, a signal Vs to be transferred to actuator 7 is applied to terminal T3 which is connected to the other input terminal (+) of amplifier U1. As such, regulator 112 controls output current Iout in response to signal Vs, current Iout being fed to actuator 7 from external terminal T1. Output current Iout is given by $$Iout = Vs/R$$

In this manner, the circuit of FIG. 9 can use the same main components, irrespective of whether the circuit operates in the above described first mode or second mode. In addition, the operational mode can be switched by operating mode switching circuit 113.

In the above embodiment, the typical transmitter 6 and actuator 7 are interconnected. In the field, a transmitter or sensor producing a voltage signal and an actuator actuated by the voltage signal are added to the above components. The circuit of FIG. 9 can readily cope with the situation where these transmitters, sensors, actuators are added. The operation performed under this condition is next described as another mode.

ANOTHER MODE. In this mode, the FIG. 9 circuit is operated as an input circuit which receives a voltage signal delivered from a transmitter or sensor.

Examples of such transmitters or sensors are shown in FIGS. 19(a) and 19(b). FIG. 19(a) shows the case in which a sensor comprising a thermocouple is used. The thermocouple applies a voltage Vp of sever millivolts to the external terminals T1,T2 of FIG. 9. The thermocouple is not required to be electrically powered.

Figure 12:
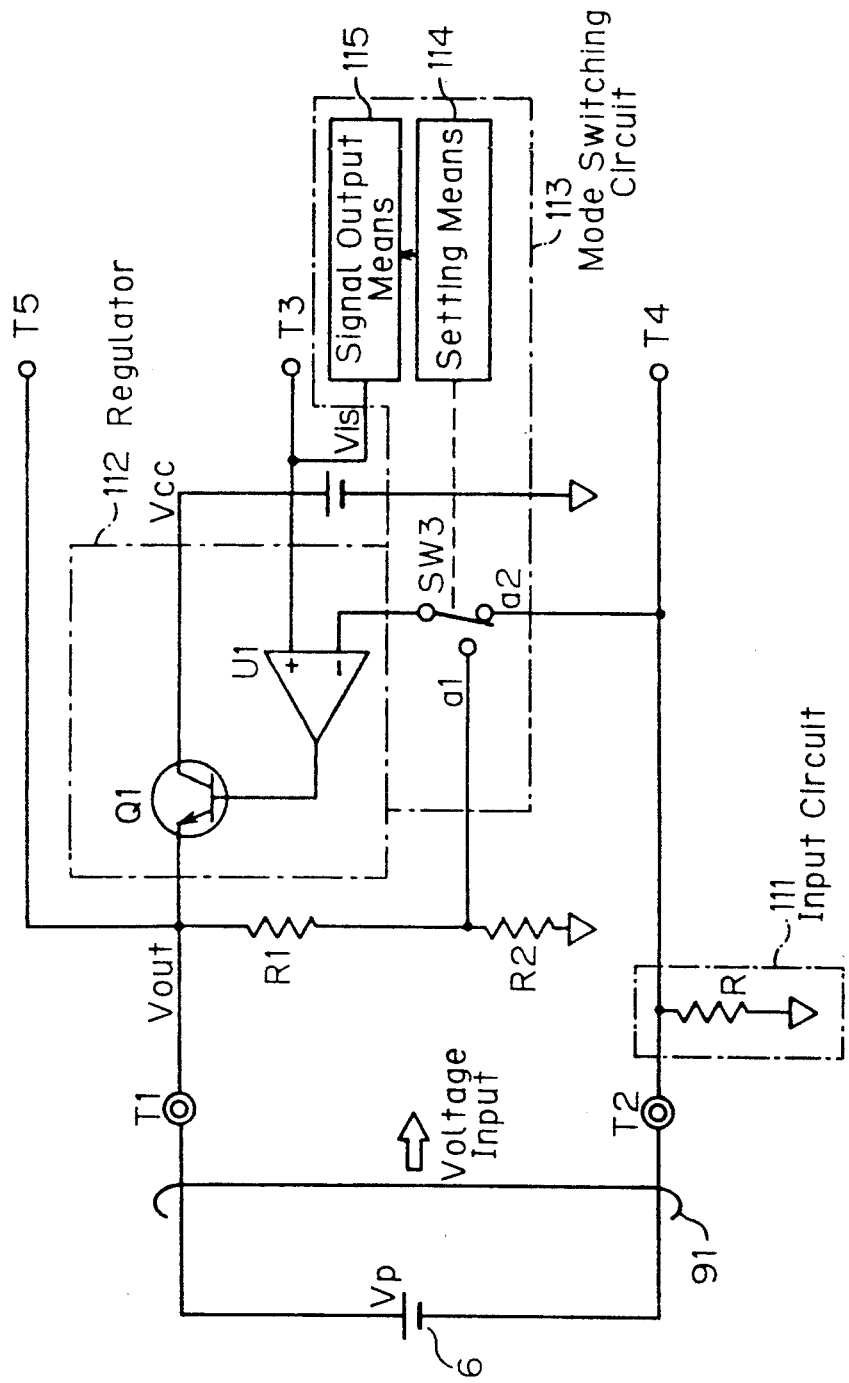
FIG. 12 is a diagram, similar to FIG. 11, depicting various modifications thereof.

FIG. 19(b) shows the case where a potentiometer is used as the transmitter. The sliding contact of the potentiometer is driven according to the process control amount. In this case, it is necessary that the potentiometer be supplied with constant current Iout (which is normally 4 mA) from the signal conditioner. As a result, the potentiometer applies a voltage given by vp=rp . Iout to external terminals T1,T2, where rp is the resistance of the potentiometer. When the thermocouple or potentiometer is connected to external terminals T1,T2, the circuit of FIG. 9 is connected and designed as shown in FIG. 12.

First, when the thermocouple of FIG. 19(a) is connected to external terminals T1,T2 of FIG. 12, the resulting circuit operates as follows. The thermocouple is connected to signal conditioner 50. Control circuit 1 causes mode setting means 114 to connect switch SW3 to contact a2. Thus, resistor R is connected, as a feedback resistor, to one input terminal (−) of amplifier U1 of regulator 112. Signal output means 115 applies a signal Vis to the other input terminal (+) of amplifier U1 to cut off regulator 112. Since transistor Q1 is biased OFF, no electric power is supplied from external terminal T1 to the thermocouple. In this manner, voltage signal Vp sent from the thermocouple of FIG. 19(a) via transmission path 91 is taken out as voltage Vout from terminal T5 connected to external terminal T1.

$$Vout = Vp \cdot (R1+R2)/(R+R1+R1)$$

Voltage Vout appearing at terminal T5 is amplified by a variable gain amplifier (e.g. shown in FIG. 21 as 131) and fed to ADC 52 of FIG. 8.

When the potentiometer shown in FIG. 19(b) is connected to external terminals T1,T2 shown in FIG. 12, the resulting circuit is as follows. The potentiometer is connected to signal conditioner 50. In the same way as the thermocouple is used, setting means 114 connects switch SW3 to contact a2 under control of control unit 1. Signal output means 115 applies voltage Vis to input terminal (+) of amplifier U1. The value of voltage Vis is given by Vis=4 mA·R. That is, regulator 112 operates as a constant current source delivering an electrical current of 4 mA. Consequently, the potentiometer applies a voltage (Vp=rp·4 mA) to external terminals T1,T2. Voltage Vp is taken as voltage Vout from terminal T5 in the same way as for the thermocouple.

The above voltage Vout taken out from terminal t5 indicates output signal Vp from the thermocouple or potentiometer. In this manner, the circuit of FIG. 9 can accommodate itself to a transmitter or sensor which produces a voltage signal, such as a thermocouple or potentiometer, without the need for changing the basic circuitry, by operating the setting means 14 in a straightforward manner.

A FURTHER MODE. In this mode, the FIG. 9 circuit is operated as the output circuit 68 which delivers an actuator control signal of a constant voltage.

Figure 13:
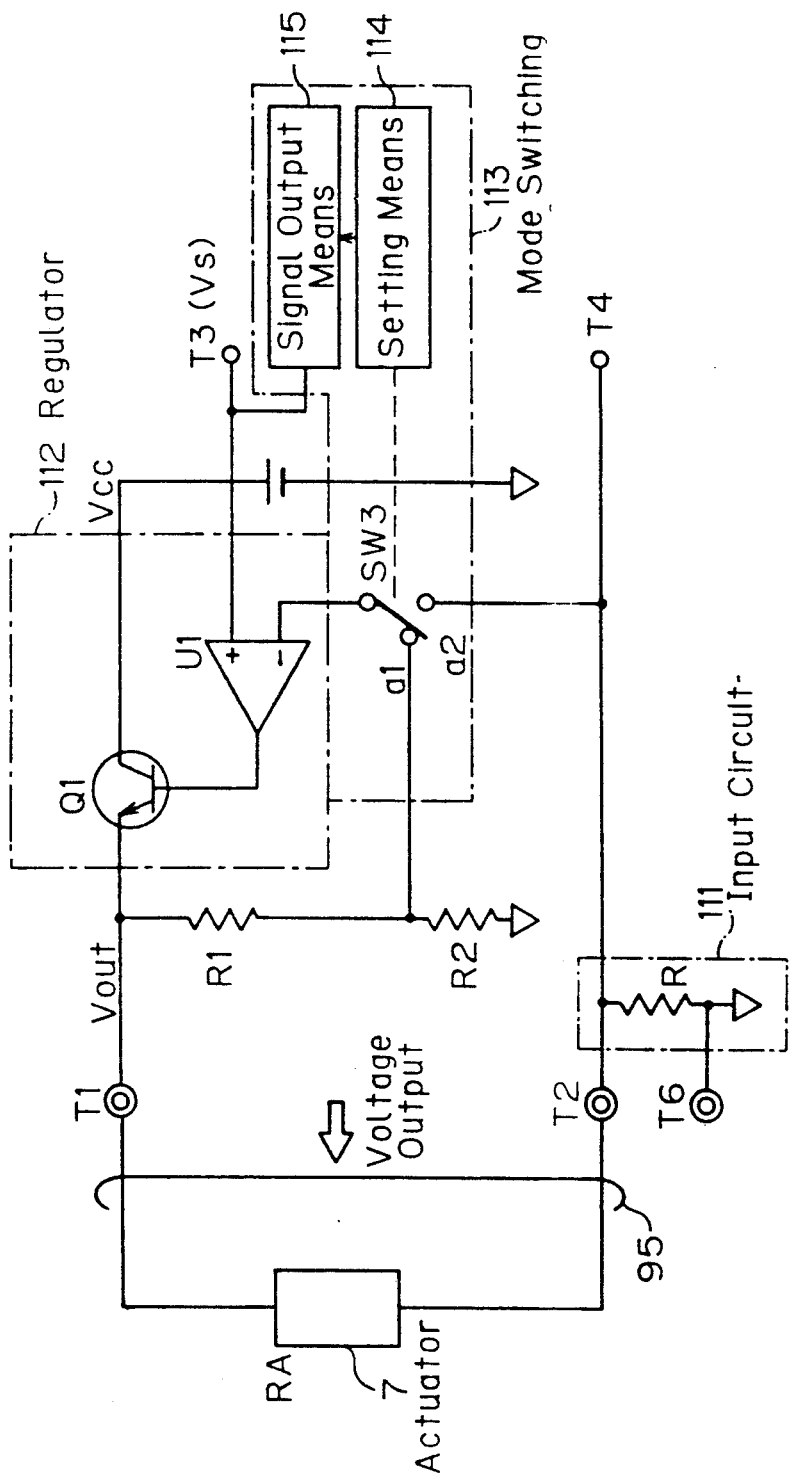
FIG. 13 is a diagram, similar to FIG. 10, depicting various modifications thereof.

To actuate actuator 7, a voltage signal, e.g. Vout=1 to 5 volts, must be applied thereto. The FIG. 9 circuit is connected as shown in FIG. 13. Acuator 7, which operates on a voltage signal of 1 to 5 volts, for example, is connected between external terminals T1 and T2, as shown in FIG. 13, via transmission path 95. In this case, setting means 114 connects switch SW3 to contact a1 under instructions from control unit 1 of FIG. 8. The voltage divided by resistors R1 and R2 is fed back to input terminal (−) of amplifier U1 so that regulator 112 operates in a constant voltage mode. Since voltage Vs is applied to the other input terminal (+) of amplifier U1 via terminal T3, output voltage Vout from regulator 112 is given by $$Vout = Vs \cdot \{1+(R1/R2)\}$$

That is, a voltage is applied to terminal T3 of FIG. 13 from control circuit 94 shown in FIG. 8 such that Vout assumes a value of 5 volts, for example.

In the embodiment, it is assumed that R<<RA, wherein RA is the internal resistance of actuator 7. Where resistance R is not negligible, the voltage signal developed between both ends of resistor R is taken out from terminal T4 as shown in FIG. 13 to correct the value of voltage Vs applied to input terminal (+) of amplifier U1. In this manner, the circuit of FIG. 9 can treat a voltage signal with the same circuit by operating setting means 114 in a straight-forward manner.

Embodiment using combination of input signals and two line transmission

Figure 14:
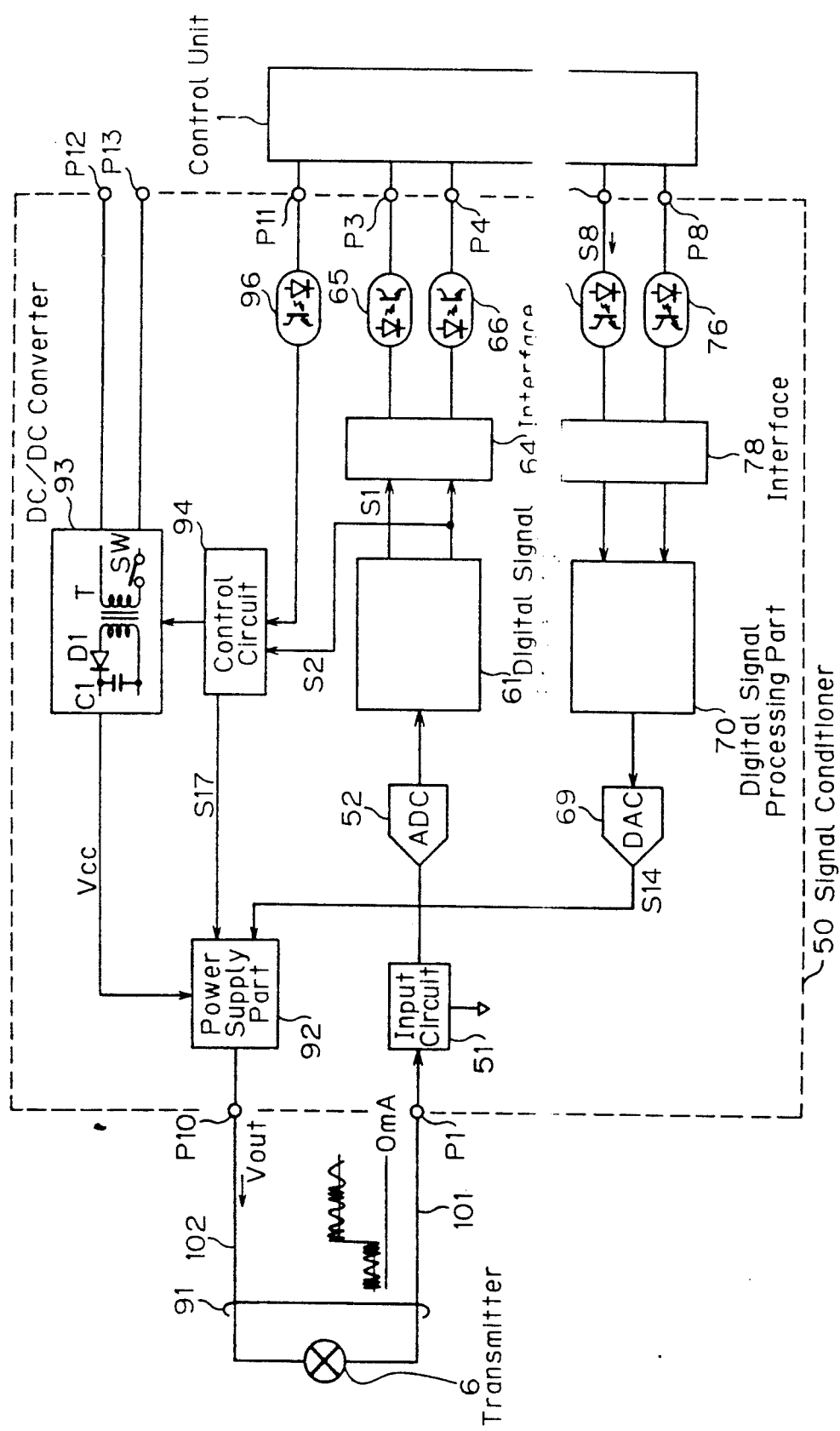
FIG. 14 is a block diagram depicting still further illustrative embodiment of the invention.

FIG. 14 shows an example of the connection made when a combination of a low frequency signal, such as a DC power signal or a signal obtained by measurement, and modulated wave, or communication information, is transferred through a two line transmission path 91. The relation between the embodiment of FIG. 14 and the embodiment of FIG. 8 is as follows. The FIG. 14 embodiment does not use the output circuit 68 of FIG. 8, and the output S14 from DAC 69 is fed to power supply part 92.

The interconnection of power supply part 92 of FIG. 14 will now be described with reference to FIG. 9. Control circuit 94 of FIG. 14 applies a signal S17 to terminal T3 of FIG. 9. DAC 69 corresponds to signal output means 115 of FIG. 9. The interconnection shown in FIG. 8 can be easily changed to the interconnection of FIG. 14 under instructions from control unit 1. Of course, the electrical circuit components shown in FIG. 14 are the same as those of FIG. 8.

The operation of signal conditioner 50 shown in FIG. 14 is as follows. It is necessary that transmitter 6 of FIG. 14 be supplied with a constant voltage of, for example, 24 volts, from a direct current power supply. It is assumed that transmitter 6 of FIG. 14 is capable of receiving communication information M1 carried by a high frequency or modulated wave superimposed on this voltage of 24 volts. It is also assumed that transmitter 6 can send to input circuit 51 a combination of low frequency signal of 4 to 20 mA and communication information M2 carried by the high frequency or modulated wave, the low frequency signal being obtained by measurement. One example of communication information M1, sent from signal conditioner 50 to transmitter 6, is information about instructions for modifying the measuring range of transmitter 6. One example of communication information M2, sent from transmitter 6 to signal conditioner 50, is information indicating the measuring range that is in response to communication information M1.

In this case, power supply part 92 of FIG. 14 is connected as shown in FIG. 10 under control of control unit 1. Regulator 112 delivers a constant DC voltage (Vout=24 volts) from external terminal T1. Control unit 1 produces transmitted signal S8. For example, it delivers digital information M1 indicating measuring range L1 of transmitter 6.

Transmitted signal S8, or communication information, which is produced form control unit 1 and indicates measuring range L1 is supplied to digital signal processing part 70 via photocoupler 75 and interface 78. The signal is then changed into a digitally modulated signal S12 indicating communication information M1 inside processing part 70 (see FIG. 1). Signal S12 is fed to DAC 69 via adder 71.

DAC 69 converts the digitally modulated, digitally coded signal into analog form, e.g., the FSK modulated wave described in connection with FIG. 5. The resulting analog signal is fed to power supply part 92. A voltage signal Eo, for producing a direct current of 24 volts, is applied to input terminal (+) of amplifier U1 of power supply part 92 connected as shown in FIG. 10. Also, DAC 69, i.e., the signal output means 115, applies a high frequency signal (FIG. 5(b)) to the same input terminal (+). As a result, a constant DC voltage of 24 volts, on which the high frequency signal shown in FIG. 5(b), is superimposed, is supplied to transmitter 6 from terminal P10 of FIG. 14 through transmission line 102.

Transmitter 6 is powered with a direct current of 24 volts supplied via transmission line 102. Transmitter 6 demodulates the modulated wave superimposed on the direct current, and sets its range to measuring range L1 indicated by the communication information M1. Transmitter 6 converts a value measured in the field into low frequency signal of 4 to 20 mA, and applies a current Iin to external terminal T2 shown in FIG. 10. Current Iin is obtained by superimposing the high frequency signal, or modulated wave signal, indicating the set measuring range, on the low frequency signal. Current Iin, containing a combination of these two types of signals, is converted into a voltage signal by resistor R and appears at terminal T4. This voltage signal is then amplified by an amplifier (not shown) of input circuit 51 and fed to ADC 52.

After the signal passes through ADC 52, photocoupler 65 produces a high frequency signal S5 indicating the measuring range set by transmitter 6. Photocoupler 66 produces measurement signal S6 indicating the value obtained by transmitter 6. The operation has been already described in connection with FIG. 1.

Where signal conditioner 50 is connected as shown in FIG. 14, supply of DC electric power, transmission of the value obtained by measurement, and bidirectional communication can be simultaneously effected by interconnecting control unit 1, or signal conditioner 50, and transmitter 6 via the two transmission lines. Also, the embodiment can be modified to be as shown in FIG. 14 without adding more circuit components to the embodiment of FIG. 8. This modification can be readily made according to control signals from control unit 1.

Figure 15:
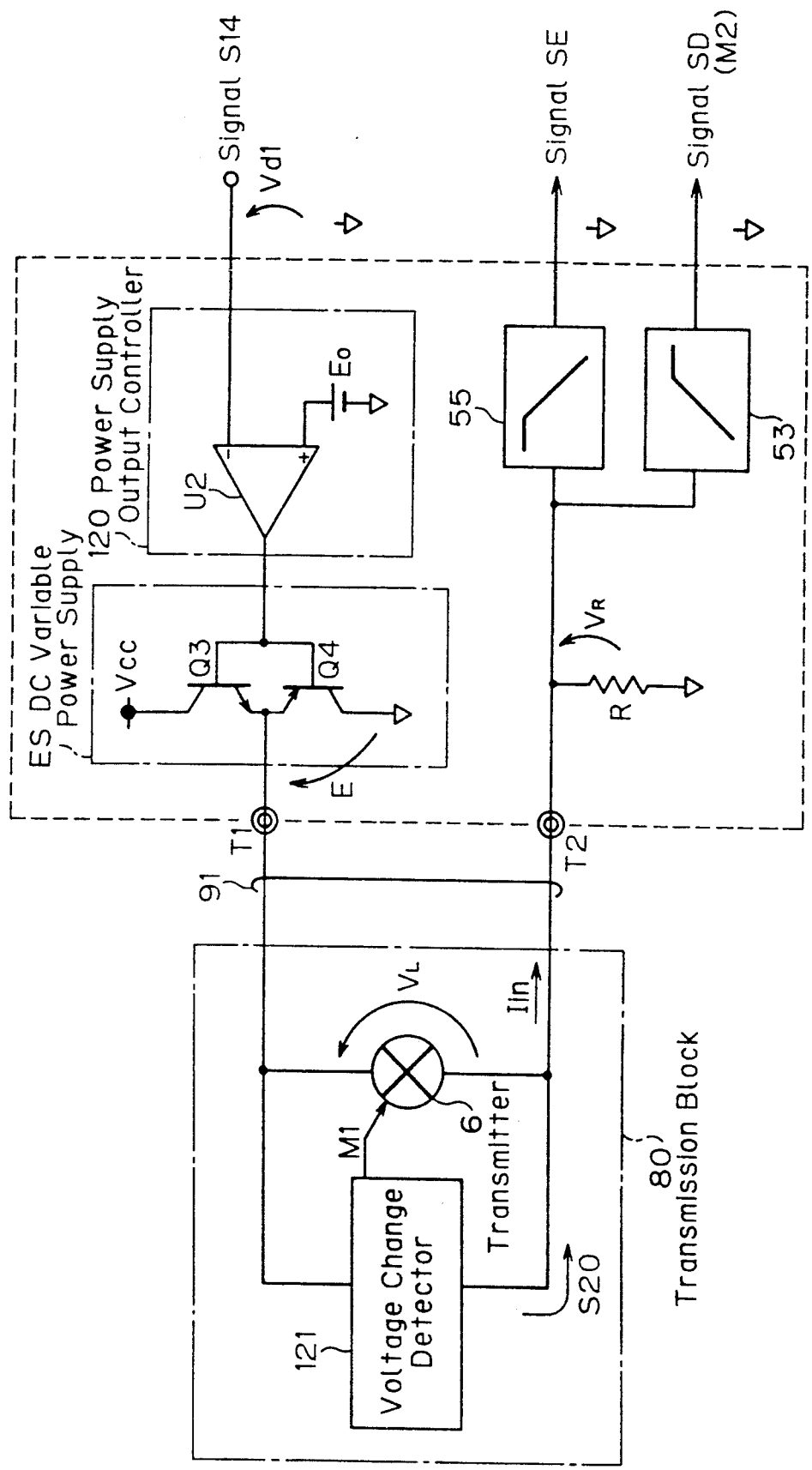
FIG. 15 is a circuit diagram depicting the power supply part of FIG. 14, and surrounding circuitry.

To simplify description of operation of FIG. 14, reference is made to FIG. 15 which combines main portions of FIGS. 10 and 14. The reason why supply of DC power, transmission of value obtained by measurement, and bidirectional communication can be simultaneously effected by interconnecting control unit 1, or signal conditioner 50, and transmitter 6 via the two line transmission path, is described with reference to FIG. 15.

In FIG. 15, a power supply output controller 120 receives output signal S14 from DAC 69 shown in FIG. 14, output signal S14 being a transmitted signal of a high frequency. Controller 120 controls, for example, output voltage E from variable DC power supply Es according to signal S14. Controller 120 comprises an operational amplifier U2, for example. Signal S14 is applied to one input terminal (−). Applied to the other input terminal (+) of amplifier U2 is a voltage signal Eo determining the output voltage value E of power supply Es. Voltage signal Eo is equivalent to signal Eo applied to terminal T3 shown in FIG. 10.

Variable DC power supply Es comprises transistors Q3 and Q4 whose collectors are connected with a power supply Vcc and common, respectively. The emitters of transistors Q3,Q4 are connected to one transmission path 91. Power supply Es is equivalent to transistor Q1 of FIG. 10. Power voltage Vcc, shown in FIG. 15, is the same power voltage Vcc shown in FIG. 10.

A transmission block 80 is composed of a transmitter 6 and a voltage change detector 121. In transmitter 6, shown in FIGS. 1, 8, 14, voltage change detector 121 shown in FIG. 15 is not shown. Detector 121 incorporates a microprocessor, extracts the high frequency components, or signal S14, contained in DC voltage E applied from signal conditioner 50, and controls transmitter 6 according to information M1 indicated by signal S14.

Transmitter 6 delivers a low frequency current of 4 to 20 mA according to value measured in the field. Voltage change detector 121 superimposes the high frequency signal, or the modulated signal, on the low frequency current produced from transmitter 6 and sends the resulting signal back to signal conditioner 50, high frequency signal containing information M2 responding to information M1 supplied from signal conditioner 50.

A resistor R is used to extract signal Iin as a voltage signal Vr, signal Iin being transmitted via transmission path 91. Resistor R is equivalent to resistor R shown in FIG. 10.

Voltage VR obtained by resistor R is applied to a low pass filter 55 and also to a band pass filter 53. Low pass filter 55 produces a signal SE of 4 to 20 mA, signal SE indicating the value obtained by measurement. Band pass filter 53 produces component SD (FIG. 1) of the high frequency signal. In FIG. 15, an amplifier, for amplifying the voltage signal VR from resistor R, and ADC 52, shown in FIG. 1, 8, 14, are omitted.

Figure 16:
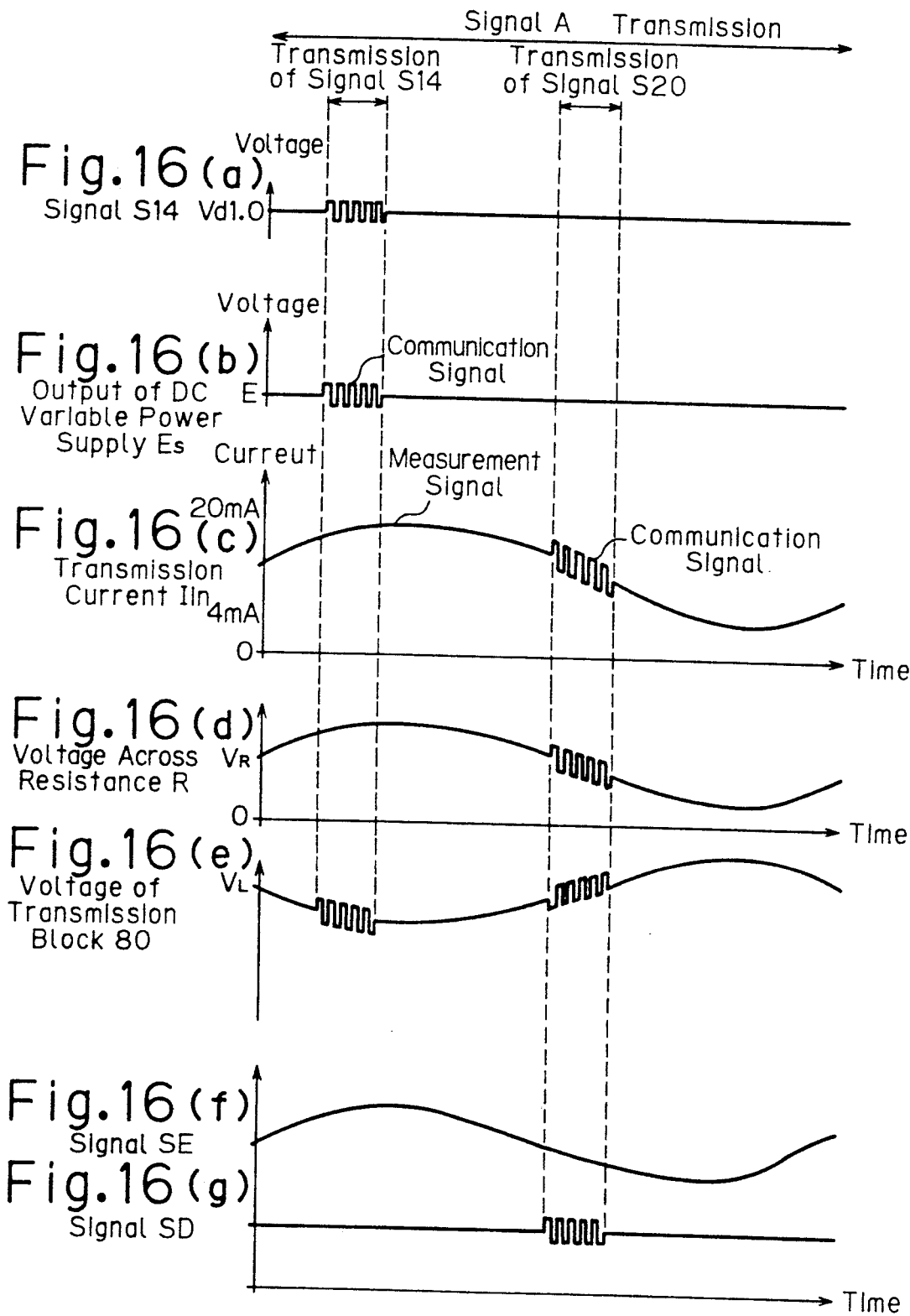
FIGS. 16(a-g) are timing chart depicting signals produced at various locations of the circuit of FIG. 15.

The operation of embodiment of FIG. 15 is as follows, referring to FIGS. 16(a)-16(g). FIGS. 16(a) shows signal s14, shown in FIG. 15.

In this example, the signal varies in positive and negative directions. Operational amplifier U2 receives a signal 14 shown in FIG. 16(a) and constant voltage signal Eo, and controls output voltage E from variable DC power supply Es according to the difference between them. In this manner, output voltage E sent to the transmission path 91 from power supply Es changes in response to high frequency signal S14 while signal S14, whose voltage amplitude is indicated by Vd1, is being produced as shown in FIG. 16(b). Voltage E sent form variable power supply Es is given by $$E = Eo + Vd1 \tag{1}$$

Transmission block 80 varies current Iin flowing through transmission path 91 according to the process control amount. Transmitted current Iin varies in an analog manner within the range, for example, of from 4 to 20 mA, according to the process control amount shown in FIG. 16(c). Current Iin is sent to signal conditioner 50 via transmission path 91 and flows into resistor R. A voltage signal VR as shown in FIG. 16(d) is produced across resistor R by transmitted current Iin. Voltage signal VR is given by $$VR = R \cdot Iin \tag{2}$$

From equations (1) and (2), voltage VL, applied across transmission block 80 connected with the two line transmission path 91, is given by $$\begin{aligned} VL &= E - VR \\ &= Eo + Vd1 - R \cdot Iin \end{aligned} \tag{3}$$

Voltage V1 assumes a waveform as shown in FIG. 16(e). In this way, voltage V1 applied to transmission block 80 varies according to high frequency signal S14. Voltage change detector 121, included in transmission block 80, detects the change in voltage V1 and extracts high frequency signal S14 sent from signal conditioner 50. Then, information M1, indicated by signal S14 is read, and transmission 6 is controlled according to information M1. Voltage VL produced across transmission block 80 is so high that a rated voltage high enough to operate transmission block 80 is maintained if flowing transmission current Iin assumes its maximum value, e.g. 20 mA.

High frequency modulated signal S20, or communication signal, which is transmitted from transmission block 80 to signal conditioner 50 varies transmitted current Iin in positive and negative directions, for example, as shown in FIG. 16(c). High frequency signal S20 induces changes in voltage Vr develope across resistor R. The low frequency signal, or a signal indicating the value obtained by measurement, which is sent from transmission block 80 and corresponds to the process control amount is passed through low pass filter 55, thus resulting in signal SE shown in FIG. 16(f), where signal SE from filter 55 takes an analog waveform. In practice, however, signal SE is a digitally coded signal indicating each instantaneous value of the amplitude of the analog waveform.

High frequency modulated signal S20, or communication signal, sent from transmission block 80 is passed through band pass filter 53, whereby a signal SD shown in FIG. 16(g) is extracted. In FIG. 16(g), signal SD produced from filter 53 is shown to assume an analog waveform. In practice, however, it is a digitally coded signal indicating each instantaneous value of the amplitude of the analog waveform.

In the embodiment of FIG. 15, resistor R is connected in series with two line transmission path 91. Therefore, power voltage VL applied to transmission block 80 is reduced accordingly. In particular, power voltage VL applied to transmission block 80 is given by $$VL = E - Iin \cdot R \quad (4)$$

Figure 17:
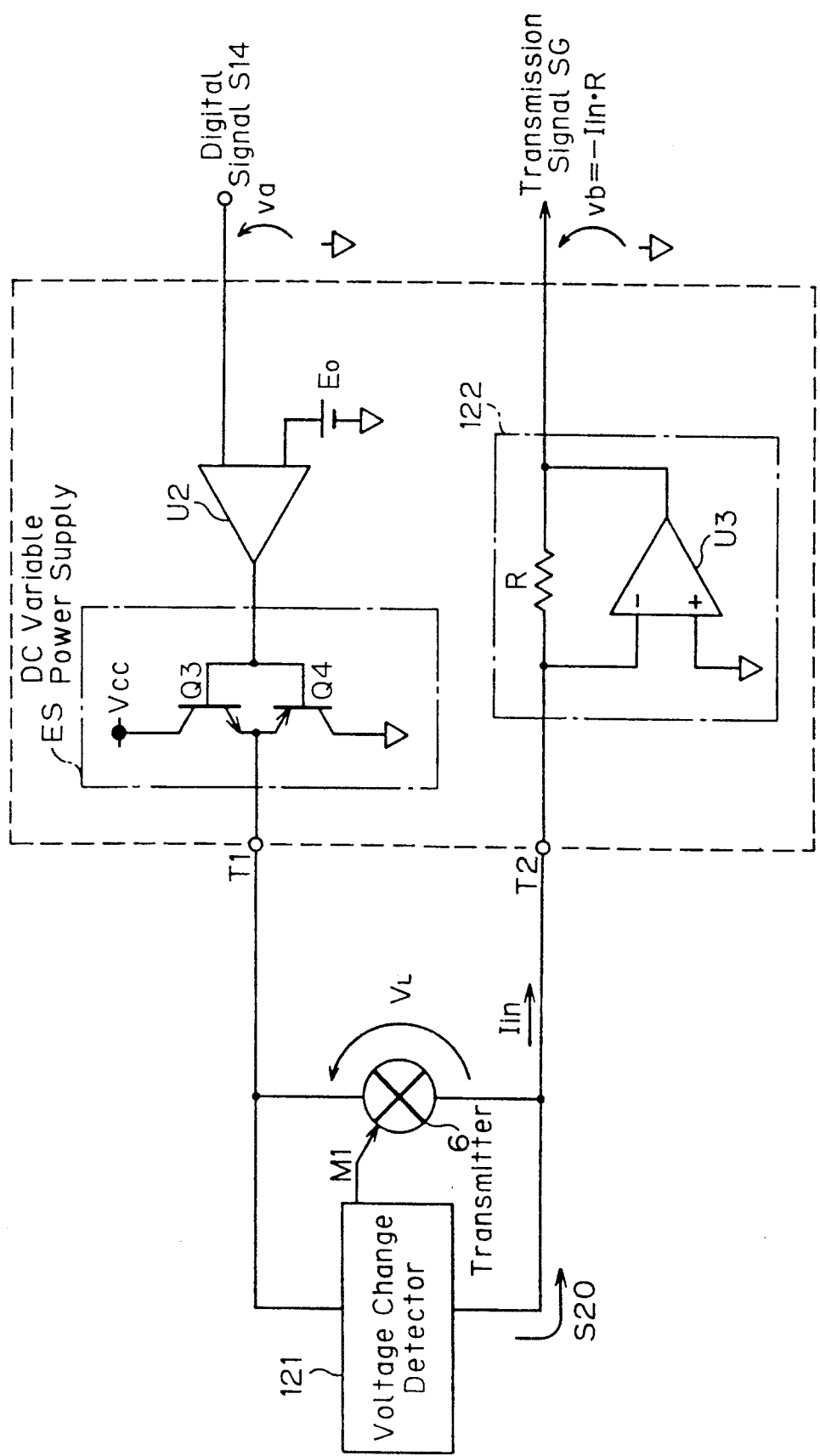
FIG. 17 is a circuit diagram depicting a modification of the circuit of FIG. 15.

Therefore, it is necessary to design the circuitry to maintain normal operation if transmission current Iin assumes its maximum value, for example, 20 mA. The embodiment of FIG. 17 solves this problem. In FIG. 17, resistor R is connected between the output terminal and the input terminal (−) of amplifier U3. The input terminal (+) of amplifier U3 is connected to common. The input terminal (−) of amplifier U3 can be regarded as the common, or virtual ground point. Thus, we have $$VL = E$$

Figure 18:
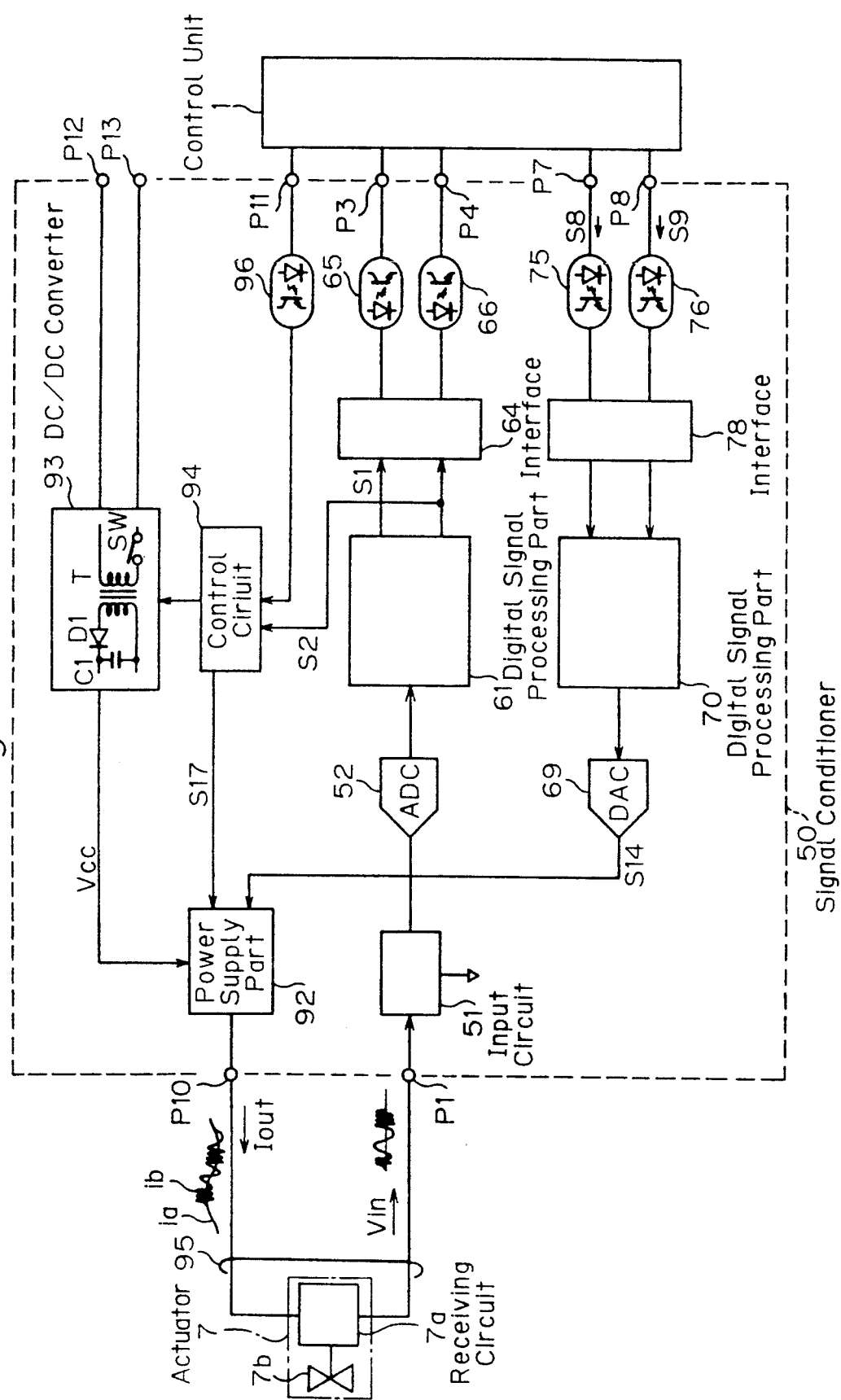
FIG. 18 is a block diagram depicting yet another illustrative embodiment of the invention.

The actual control signal of 4 to 20 mA can be sent from control unit 1 to actuator 7 by connecting actuator 7 between terminals P10 and P1 via two line transmission path 95 without changing the structure of signal conditioner 50 shown in FIG. 14. At the same time, bidirectional communication can be effected between control unit 1 and actuator 7. Where the embodiment of FIG. 18 is operated, power supply part 92 is connected to the embodiment of FIG. 11. In this case, switch SW3 is connected to contact a2, so that power supply part 92 operates in the constant current mode.

The connection of power supply part 92, shown in FIG. 18, is as follows, with reference to FIG. 11. A terminal T3, shown in FIG. 11, is connected to control circuit 94, shown in FIG. 18. In this case, signal S17 from control circuit 94 is 0, i.e. S17=0. A DAC 69 shown in FIG. 18 corresponds to signal output means 115 shown in FIG. 11. That is, only signal S14 from signal output means 115, or DAC 69 of FIG. 18, is applied to the input terminal (+) of amplifier U1 of FIG. 11.

As discussed, signal s14 is an analog voltage signal in which low frequency voltage corresponding to the current of 4 to 20 mA is multiplexed with the modulated high frequency voltage signal indicating communication information M1. Information M1 is transmitted from control unit 1 to actuator 7. In FIG. 18, communication information M1 originates from signal S8 delivered from control unit 1.

Regulator 112, shown in FIG. 11, operates in the constant current output mode. Let V14 be the voltage of signal S14. Current Iout produced from regulator 112 is given by $$Iout = V14/R$$

As a result, as described with reference to FIG. 18, power supply part 92 produces a signal in which low frequency current components ia (corresponding to 4 to 20 mA) and high frequency component ib (corresponding to the communication information) are superimposed.

Actuator 7 is actuated with the incoming low frequency component ia. Receiving circuit 7a produces a modulated signal Vin to terminal P1, signal Vin containing information M2 about the response to incoming communication information M1.

Modulated signal Vin is fed to input circuit 51. Digital signal processing part 61 extracts signal S1, indicating information M2 (see FIG. 1), by performing the above operations. Signal S5, indicating information M2, is sent to control unit 1.

In the embodiment of FIG. 18, signal Vin sent from actuator 7 contains only the communication information and so only filter 53, of filters 53 and 55 included in digital signal processing part 61, is operated.

Circuit using low pass filter

FIG. 21 shows an embodiment which is similar to that portion of FIG. 1 which begins with the input terminal P1 and ends with the outputs of digital demodulator 54 and digital filter 55. Demodulator 54 delivers communication information S1. The output from filter 55 is signal SE indicating the value obtained by measurement. In FIG. 1, band pass filter 53, which can be replaced with a high pass filter, and low pass filter 55 are connected in parallel. On the other hand, in FIG. 21, two digital low pass filters 132, 133 are connected in series. The embodiment of FIG. 21, low frequency signal SE and high frequency communication information S1 can also be separately extracted.

Referring still to FIG. 21, an input terminal P1 corresponds to input terminal P1 shown in FIG. 1. A resistor R is connected between input terminal P1 and common potential via a switch 136. Switch 136 is turned ON and OFF under control of control unit 1 of FIG. 1. A signal, in which a low frequency signal ea indicating the value obtained by measurement, as shown in FIG. 22(a) and a high frequency communication signal eb are superimposed, is applied to input terminal P1. It is assumed that low frequency signal ea of FIG. 22(a) and the frequency components contained in communication signal eb lie within a frequency range which is lower than frequency fw shown in FIG. 23.

Normally, a variable gain amplifier 131 amplifies the voltage developed across resistor R to a voltage level, e.g., 1 volt, which can be easily treated by the next stage of the circuit. The amplification degree of this amplifier 131 is controlled by control unit 1 of FIG. 1.

The output from variable gain amplifier 131 is applied to $\Sigma$-$\Delta$ modulator 52, where the signal is converted into digital form. Modulator 52 is an oversampled analog to digital converter. Since modulator 52 has already been described in connection with FIG. 3, it will not be further discussed hereat. The sampling frequency of modulator 52 is kept at a given frequency, for example, 1 MHz. The output from modulator 52 is supplied to low pass filter 132.

Low pass filter 132 calculates the moving average of the plurality, for example 32, of successive digital codes produced from $\Sigma$-$\Delta$ modulator 52. In particular, modulator 52 produces digital codes each assuming level 1 or 0, at intervals of 1 MHz, or 1 $\mu$sec. Low pass filter 132 totalizes the 32 successive digital codes and then divides the calculated value by 32 to compute the average value. This series of operations is repeated for each input coded signal. Thus, the moving average of the digital codes is calculated.

Low pass filter 132, operating in this manner, exhibits an attenuation characteristic 140 shown in FIG. 23. The output signal, indicated by S30, from filter 132 is a digitally coded signal (FIG. 22(b)) containing both a low frequency signal ea indicating the value obtained by a measurement and a high frequency communication signal eb.

The value of the corner frequency fw of the filter characteristic 140 shown in FIG. 23 can be varied by replacing the value 32 with a different value. This modification can be made in response to a signal from control unit 1. Control unit 1 can set the corner frequency to such a value, e.g. 32, that the high frequency eb sent to terminal P1 is not cut by low pass filter 132.

Back low pass filter 133 accepts the output data from the front low pass filter 132 and calculates the moving average of the eight, for example, successive digital codes delivered from front filter 132. In particular, back filter 133 totalizes the 256 (32×8=256) successive digital codes delivered from $\Sigma$-$\Delta$ modulator 52 and divides the calculated value by 256. That is, back filter 133 takes the moving average of the 256 digital codes. Then, back filter 133 extracts signals of only those frequencies which are lower than those extracted by front low pass filter 132.

Back low pass filter 133, which operates as described above, shows an attenuation characteristic 141 whose corner frequency is indicated by fu in FIG. 23. That is, output signal SE from back filter 133 is a digitally coded signal, as shown in FIG. 22(c) which does not contain high frequency signal eb but contains only the low frequency signal ea indicating the value derived by measurement. The characteristic of back low pass filter 133 can also be easily modified by control unit 1, in the same way as the foregoing. As a result, back filter 133 produces the low frequency components (or a signal indicating the value obtained by measurement, for example, a current of 4 to 20 mA) which are contained in signal SA applied to input terminal P1.

Meanwhile, the high frequency components, or the communication information, are extracted via a digital comparator 134 and a digital demodulator 135. Comparator 134 compares signal S30, shown in FIG. 22(b), and signal SE, shown in FIG. 22(c). Digital comparator 134 compares signal S30, shown in FIG. 22(b), with signal SE, shown FIG. 22(c). Comparator 134 produces a signal S31 whose code value varies whenever signal S30 crosses signal SE. Signal S31 indicates the period of signal eb shown in FIG. 22(b). Digital modulator 135 can detect the frequency of the high frequency signal eb, i.e., can demodulate the communication information S1 according to the period.

The embodiment of FIG. 21 where the two low pass filters are connected in series yields the following advantages. A digital low pass filter is simpler in hardware structure than a digital band pass filter and a digital high pass filter and can be made of a fewer number of electronic circuit elements than the latter filters. That is, the embodiment of FIG. 21 permits the novel signal conditioner to be easily fabricated in the form of an IC. In this manner, high frequency communication information S1 is extracted from demodulator 135, whereas low frequency signal SE indicating the value obtained by measurement is derived from back low pass filter 133.

Advantages attained by invention

The invention accrues many advantages, such as listed below.

1. With the invention, it is possible to accommodate various transmitters and various actuators simply by utilizing relatively few types of signal conditioners or hardware.

A signal supplied from a transmitter or sensor is converted by the input circuit 51 into a voltage signal exceeding a certain level. This voltage signal is all converted into digital form by ADC 52. Thus, a digital signal corresponding to the output signal from the transmitter or sensor is obtained from ADC 52, irrespective of what type of transmitter or sensor is connected to the signal conditioner. Thus, the digital signal produced by ADC 52 contains information indicating the value obtained by measurement, as well as communication information. Digital signal processing parts 61,70 extract the value obtained measurement and communication information, by performing arithmetic operation on the digital signal fed from ADC 52, the arithmetic operation being adapted for the type of transmitter used. The contents of the digital arithmetic operations performed by digital signal processing parts 61,70 can be changed by use of appropriate software.

In brief, in accordance with the invention, the output from each transmitter or sensor is converted into digital form. Then, digital arithmetic operations suited to the type of transmitter or sensor used are performed on the resulting digital signal. In this manner, the value, obtained by measurement, and the communication information are extracted. Since the contents of the digital arithmetic operations can be modified by use of appropriate software, the inventive signal conditioners which are few in type can be readily be adapted to a variety of transmitters and actuators.

Power supply part 92, shown in FIG. 9, can be switched to any of the various circuits of differing functions shown in FIGS. 10-13, by using in common the circuit elements of FIG. 9. This also permits different types of signal conditioners to accommodate various types and numbers of transmitters and actuators.

According to the invention, different types of signal conditioners can be replaced with one type of hardware.

2. Signals can be appropriately transmitted and received with the invention whether or not the connected transmitter or actuator has a communication function.

3. The analog signal processing part of the prior art type apparatus can be easily replaced by using the digital signal processing parts 61,70 of the invention. Digital signal processing parts 61,70, ADC 52, and DAC 69 are digital circuits and are adapted to be easily fabricated in the form of an IC. This enables miniaturization of the signal conditioner.

Where an oversampled ADC is used as ADC 52, shown in FIG. 1, and an oversampled DAC is used as DAC 69, it is more easy to fabricate these components in the form of an IC. This is now described with reference to FIG. 3. An analog to digital converter is required to be equipped with a prefilter 81 to prevent foldover noise due to sampling. Prefilter 81 comprises analog elements such as a capacitor. Thus, where the ADC is fabricated in the form of an IC, the large size of this analog prefilter 81 poses problems. However, in the oversampled system, signals are sampled at a relatively high speed and so the prefilter 81 can be fabricated from a small capacitor or the like. That is, the oversampled converters are adapted to be incorporated in an IC.

4. In the invention, both the receiving circuit part and the transmitting circuit part perform digital arithmetic operations on input signals to obtain desired signals. Thus, the contents of the digital arithmetic operations can be modified by use of appropriate software if the input or output conditions are changed. Thus, the invention can quickly cope with modifications in external conditions.

5. In the embodiments of FIGS. 14, 15, supply of DC power, transmission of the values obtained by measurements, and bidirectional communications can be simultaneously effected simply by interconnecting control unit 1, or signal conditioner 50, and transmitter 6 via the two transmission lines.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A signal conditioner connected to a transmitter via a transmission path, said signal conditioner permitting signals, including measurement information and communication information, to be smoothly transmitted between said transmitter and a control unit, said signal conditioner comprising
    input circuit means for receiving an output signal from said transmitter via said transmission path and for converting said output signal into an analog voltage signal exceeding a given level;
    analog to digital conversion means for converting said analog voltage signal from said input circuit means into a digital signal components from said digital signal from said analog to digital conversion means;
    second digital filter means for extracting high speed signal components from said digital signal from said analog to digital conversion means;
    first digital processing means for digitally processing the extracted low speed components from said first digital filter means thereby to obtain measurement information; and
    second digital processing means for digitally processing the extracted high speed signal components from said second digital filter means thereby to obtain communication information.

2. The conditioner of claim 1, wherein said transmission path comprises two transmission lines.

3. A signal conditioner connected to a transmitter via a transmission path, the signal conditioner permitting signals to be smoothly transmitted between the transmitter and a control unit, said signal conditioner comprising
    a digital modulating means which receives a first digital signal indicating communication information transferred from the control unit to an actuator and which produces a second digital signal corresponding to each instantaneous value of the amplitude of a modulated signal indicating the communication information;
    an adder for producing a sum of a third digital signal and said second digital signal, the third digital signal corresponding to the amount to which the acutator is controlled;
    a digital to analog conversion means which receives the sum from the adder and converts the output to an analog signal; and
    an output circuit which receives the analog output signal from the digital to analog conversion means, amplifies the analog signal, and sends the amplified signal to the actuator.

4. The conditioner of claim 3, wherein said transmission path comprises two transmission lines.

5. The conditioner of claim 4, wherein said output circuit comprises
    a regulator capable of operating either in a constant current mode in which the regulator supplies a constant current to an external terminal connected to one of said two transmission lines, or in a constant voltage mode in which the regulator supplies a constant voltage to the external terminal; and
    a mode switching means which switches the regulator between the constant voltage mode and the constant current mode, depending on the type of actuator connected to the external terminal 6. A signal conditioner connected to an actuator via two transmission lines, the signal conditioner permitting signals to be smoothly transmitted between the actuator and a control unit, said signal conditioner comprising
    a power supply means which supplies a DC current to the actuator via the two transmission lines and which can vary the DC current to the actuator via the two transmission lines and which can vary the DC current according to a high speed signal containing communication information transferred from the control unit to the actuator;
    an input circuit which receives a signal sent from the actuator and converts the signal to an analog signal which exceeds a given level;
    an analog to digital conversion means for converting the analog signal from the input circuit into a digital signal;
    a digital filter for extracting high speed signal components from the digital signal; and
    a demodulating means which digitally processes the extracted high speed signal components to extract the communication information transferred from the actuator to the control unit.

7. A signal conditioner connected to a transmitter via a transmission path comprising two transmission lines and an external terminal connected to one of said two transmission lines, said signal conditioner permitting signals, including measurement information and communication information, to be smoothly transmitted between said transmitter and a control unit, said signal conditioner comprising power supply means disposed in said signal conditioner for supplying DC power to said transmitter via said transmission path;

input circuit means for receiving an output signal from said transmitter via said transmission path and for converting said output signal into an analog voltage signal exceeding a given level;

analog to digital conversion means for converting said analog voltage signal into a digital signal;

first digital filter means for extracting low sped signal components form said digital signal;

second digital filter means for extracting high speed signal components from said digital signal;

first digital processing means for digitally processing the extracted low speed signal components to thereby obtain measurement information; and second digital processing means for digitally processing the extracted high speed signal components thereby to obtain communication information; wherein said power supply means comprises a regulator capable of operating either in a constant current mode to supply a constant current to said external terminal, or in a constant voltage mode to supply a constant voltage to said external terminal, and mode switching means for switching said regulator between said constant current mode and said constant voltage mode depending on the type of transmitter connected to said external terminal of said transmission path.

8. A signal conditioner connected to a transmitter via two transmission lines, said signal conditioner permitting signals, including measurement information and communication information, to be smoothly transmitted between said transmitter and a control unit, said signal conditioner comprising power supply means disposed in said signal conditioner for supplying a DC voltage to said transmitter via said two transmission lines and for varying the DC voltage according to a high speed signal containing communication information supplied by said control unit to said transmitter;

input circuit means for receiving an output signal from said transmitter and for converting the output signal into an analog voltage signal exceeding a given level;

analog to digital conversion means for converting said analog voltage signal from said input circuit means into a digital signal;

first digital filter means for extracting low speed signal components form said digital signal;

second digital filter means for extracting high speed signal components form said digital signal;

first digital processing means for digitally processing the extracted flow speed signal components form said first digital filter means thereby to obtain measurement information; and second digital processing means for digitally processing the extracted high speed signal components from said second digital filter means thereby to obtain communication information outputted from said transmitter to said control unit.

* * * * *